United States Patent
Bugenhagen

(10) Patent No.: US 11,582,154 B2
(45) Date of Patent: *Feb. 14, 2023

(54) METHOD, APPARATUS, AND SYSTEM FOR ADJUSTING ROUTING OF NETWORK TRAFFIC OR UTILIZATION OF NETWORK NODES

(71) Applicant: CenturyLink Intellectual Property LLC, Broomfield, CO (US)

(72) Inventor: Michael K. Bugenhagen, Leawood, KS (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/402,685

(22) Filed: Aug. 16, 2021

(65) Prior Publication Data

US 2021/0377175 A1  Dec. 2, 2021

Related U.S. Application Data

(63) Continuation of application No. 16/512,858, filed on Jul. 16, 2019, now Pat. No. 11,102,126.

(60) Provisional application No. 62/748,949, filed on Oct. 22, 2018.

(51) Int. Cl.
*H04L 47/125* (2022.01)
*H04L 43/022* (2022.01)
*H04L 43/065* (2022.01)

(52) U.S. Cl.
CPC .......... *H04L 47/125* (2013.01); *H04L 43/022* (2013.01); *H04L 43/065* (2013.01)

(58) Field of Classification Search
CPC ... H04L 47/125; H04L 43/022; H04L 43/065; H04L 43/0876; H04L 45/22
See application file for complete search history.

(56) References Cited

U.S. PATENT DOCUMENTS

| | | | |
|---|---|---|---|
| 10,728,140 | B2 | 7/2020 | Choudhury |
| 2006/0271658 | A1 | 11/2006 | Beliles |
| 2010/0138475 | A1 | 6/2010 | Frank |
| 2010/0161802 | A1 | 6/2010 | Tofighbakhsh |
| 2010/0284282 | A1 | 11/2010 | Golic |
| 2011/0267952 | A1 | 11/2011 | Ko |
| 2013/0166730 | A1 | 6/2013 | Wilkinson |
| 2014/0064080 | A1 | 3/2014 | Stevens |
| 2016/0013990 | A1 | 1/2016 | Kulkarni |
| 2016/0150366 | A1 | 5/2016 | Miller |
| 2017/0054641 | A1 | 2/2017 | Anerousis |

(Continued)

*Primary Examiner* — Ivan O Latorre

(57) ABSTRACT

Novel tools and techniques are provided for implementing routing of network traffic across one or more network nodes or utilization of the one or more network nodes based on one or more demand classifications and/or based on detection of a trigger event associated with the one or more demand classifications. In some embodiment, a computing system might monitor network traffic across one or more network nodes or utilization of the one or more network nodes, the network traffic being routed based on a first demand classification. The computing system might determine whether at least one trigger event associated with a second demand classification has occurred. If so, the computing system might adjust the routing of the network traffic across the one or more network nodes or adjust the utilization of the one or more network nodes, based at least in part on the second demand classification.

19 Claims, 9 Drawing Sheets

(56) References Cited

U.S. PATENT DOCUMENTS

| | | |
|---|---|---|
| 2017/0201461 A1 | 7/2017 | Cheng |
| 2017/0346708 A1 | 11/2017 | Patil |
| 2020/0021358 A1 | 1/2020 | Maccaglia |
| 2020/0116508 A1 | 4/2020 | Dashti |
| 2020/0127924 A1 | 4/2020 | Bugenhagen |
| 2020/0236085 A1 | 7/2020 | Spurlock |
| 2020/0358697 A1 | 11/2020 | Choudhury |

METHOD, APPARATUS, AND SYSTEM FOR ADJUSTING ROUTING OF NETWORK TRAFFIC OR UTILIZATION OF NETWORK NODES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing routing of network traffic across one or more network nodes or utilization of the one or more network nodes, and, more particularly, to methods, systems, and apparatuses for implementing routing of network traffic across the one or more network nodes or utilization of the one or more network nodes based on one or more demand classifications and/or based on detection of a trigger event associated with the one or more demand classifications.

BACKGROUND

Quality of service ("QoS") mechanisms typically control the routing of network traffic across one or more network nodes or the utilization of the one or more network nodes on an individual basis based on the characteristics of the different types of data, sources, and/or devices. Accordingly, while typical QoS mechanisms result in outcomes that may provide pre-determined QoS levels, abnormal or atypical network traffic across one or more network nodes or utilization of the one or more network nodes may occur that disrupt the pre-determined QoS levels or service of specific types of traffic. The abnormal or atypical network traffic or utilization of the one or more network nodes may render the typical QoS mechanisms insufficient for accommodating the abnormal or atypical network traffic condition or flow.

Hence, there is a need for more robust and scalable solutions for implementing switching of or routing of network traffic across one or more network nodes or the utilization of the one or more network nodes, and, more particularly, to methods, systems, and apparatuses for implementing routing of network traffic across the one or more network nodes or the utilization of the one or more network nodes based on one or more demand classifications and/or based on detection and/or the issue of a fairness trigger event associated with the one or more demand classifications.

BRIEF DESCRIPTION OF THE DRAWINGS

A further understanding of the nature and advantages of the embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
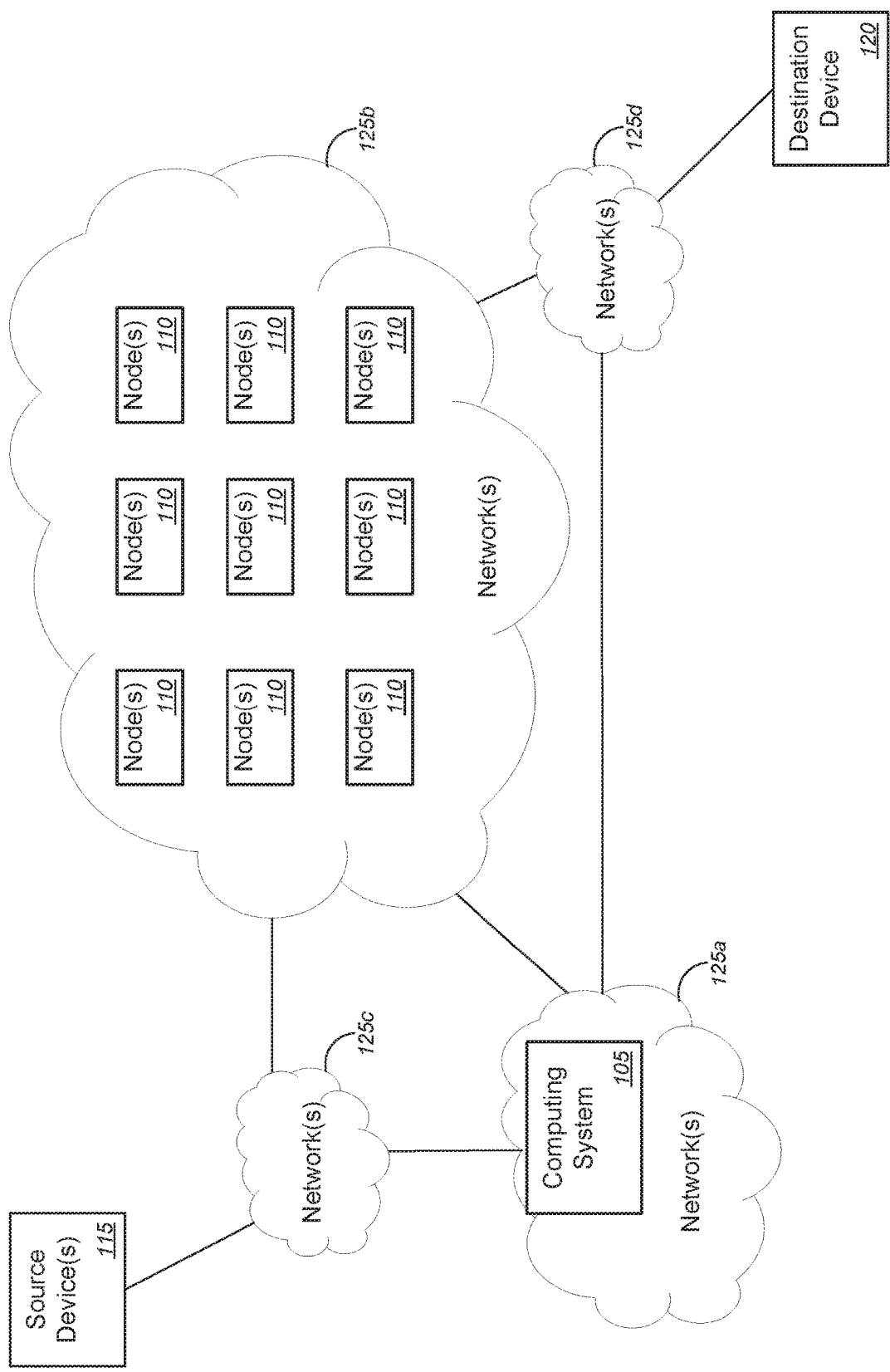
FIG. 1 is a schematic diagram of a system for implementing routing of network traffic across one or more network nodes or utilization of the one or more network nodes, in accordance with various embodiments.

Various embodiments provide tools and techniques for implementing routing of network traffic across one or more network nodes or utilization of the one or more network nodes, and, more particularly, to methods, systems, and apparatuses for implementing routing of network traffic across the one or more network nodes or utilization of the one or more network nodes based on one or more demand classifications and/or based on detection of a trigger event associated with the one or more demand classifications.

In various embodiments, a computing system might monitor at least one of network traffic across one or more network nodes or utilization of the one or more network nodes. The at least one of routing of the network traffic across the one or more network nodes or utilization of the one or more network nodes may be controlled based at least in part on a first demand classification. The computing system may then determine whether at least one trigger event associated with a second demand classification has occurred. In response to a determination that the at least one trigger event has occurred, the computing system might adjust at least one of the routing of the network traffic across the one or more network nodes or the utilization of the one or more network nodes, based at least in part on the second demand classification.

The various embodiments provide advantages over conventional quality of service mechanisms used to control at least one of the routing of the network traffic across the one or more network nodes or the utilization of the one or more network nodes. The embodiments provide mechanisms to accommodate different trigger events associated with abnormal or atypical network traffic or utilization of the one or more network nodes. The embodiments seek to optimize and/or balance routing of network traffic and/or utilization of one or more network nodes based on the one or more trigger events. In this manner, even when a trigger event occurs, routing of network traffic and/or utilization of one or more nodes may be adjusted fairly based on one or more demand classifications associated with the trigger event.

These and other features and advantages of the various embodiments are described in detail below with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, network technology, communication technology, and/or the like. In other aspects, certain embodiments, can improve the functioning of user equipment or systems themselves (e.g., customer premises equipment, networking systems, communication systems, etc.), for example, by determining, with the computing system, whether at least one trigger event associated with a second demand classification has occurred; and in response to a determination that the at least one trigger event has occurred, adjusting, with the computing system, at least one of the routing of the network traffic across the one or more network nodes or the utilization of the one or more network nodes, based at least in part on the second demand classification; and/or the like. In particular, to the extent any abstract concepts are present in the various embodiments, those concepts can be implemented as described herein by devices, software, systems, and methods that involve specific novel functionality (e.g., steps or operations), such as, determining, with the computing system, whether at least one trigger event associated with a second demand classification has occurred; and in response to a determination that the at least one trigger event has occurred, adjusting, with the computing system, at least one of the routing of the network traffic across the one or more network nodes or the utilization of the one or more network nodes, based at least in part on the second demand classification; and/or the like, to name a few examples, that extend beyond mere conventional computer processing operations. These functionalities can produce tangible results outside of the implementing computer system, including, merely by way of example, optimized and efficient routing of network traffic across one or more network nodes, compute nodes tied to network nodes, or utilization of the one or more network nodes based on detection of a trigger event, or the like.

In an aspect, a method might comprise monitoring, with a computing system, at least one of network traffic across one or more network nodes or utilization of the one or more network nodes, wherein at least one of routing of the network traffic across the one or more network nodes or utilization of the one or more network nodes is controlled based at least in part on a first demand classification; determining, with the computing system, whether at least one trigger event associated with a second demand classification has occurred; and in response to a determination that the at least one trigger event has occurred, adjusting, with the computing system, at least one of the routing of the network traffic across the one or more network nodes or the utilization of the one or more network nodes, based at least in part on the second demand classification. In some instances, the computing system might include an agent or a probe, and/or the like. Further, in some embodiments, the computing system might monitor traffic across one or more links or segments connecting the one or more network nodes. In some cases, the one or more network nodes may be shared among multiple users. The one or more network nodes may include, without limitation, at least one of one or more computing systems, one or more network elements, one or more server computers, one or more databases, one or more service provider devices, one or more user devices, one or more gateways, and/or the like. The one or more user devices might include, without limitation, at least one of a desktop computer associated with the user, a laptop computer associated with the user, a tablet computer associated with the user, a smart phone associated with the user, a cellphone associated with the user, a personal digital assistant associated with the user, a remote-control device associated with the user, or a portable gaming device associated with the user, and/or the like.

In some embodiments, the first demand classification may be a default demand classification. In other words, the first demand classification may control at least one of the routing of the network traffic across the one or more network nodes that is unassociated with a trigger event or the utilization of the one or more network nodes that is unassociated with a trigger event.

In various instances, the first demand classification and the second demand classification may each be associated with one or more rules for controlling at least one of the routing of the network traffic across the one or more network nodes or the utilization of the one or more network nodes. The first demand classification may be associated with one or more rules for controlling network traffic or utilizing network nodes that is unassociated with a trigger event. The second demand classification might include one or more rules for controlling network traffic or utilizing network nodes that is associated with a trigger event.

In some cases, the method might further include monitoring, with the computing system, at least one of adjusted routing of network traffic across the one or more network nodes or adjusted utilization of the one or more network nodes; determining, with the computing system, whether the at least one trigger event associated with the second demand classification has ended; and based on a determination that the at least one trigger event associated with the second demand classification has ended, adjusting, with the computing system, at least one of the routing of the network traffic across the one or more network nodes or the utilization of the one or more network nodes, based at least in part on the first demand classification.

In some instances, the network traffic across the one or more network nodes might include, without limitation, at least one of data traffic, audio traffic, or video traffic, and/or the like. The at least one trigger event associated with the second demand classification, might include, without limitation, at least one of a failure of the one or more network nodes, a customer creating network traffic across the one or more network nodes or utilizing the one or more network nodes, a user event creating network traffic across the one or more network nodes or utilizing the one or more network nodes, an environmental event causing network traffic to be created across the one or more network nodes or utilization of the one or more network nodes, an emergency event causing network traffic to be created across the one or more network nodes or utilization of the one or more network nodes, a location event creating network traffic across the one or more network nodes or utilizing the one or more network nodes, an unanticipated increase in at least one of the network traffic across the one or more network nodes or the utilization of one or more network nodes, or an anticipated increase in at least one of the network traffic across the one or more network nodes or the utilization of the one or more network nodes, and/or the like.

The customer creating network traffic across the one or more network nodes or utilizing the one or more network nodes might include, without limitation, at least one of one or more emergency responders, one or more business customers, one or more government customers, one or more residential customers, one or more devices, one or more machine-to-machine devices, or one or more Internet of Things devices, and/or the like.

The user event creating network traffic across the one or more network nodes or utilizing the one or more network nodes might include, without limitation, at least one of a user indicating a specific location to save data, a user indicating one or more routes to transmit network traffic, a user indicating one or more resources to utilize, or a user indicating network traffic to prioritize, and/or the like. In a non-limiting example, a user may indicate that data may need to be saved in a city, state, province, territory, region, or country where the user resides. A user may indicate that data may need to be routed through a city, state, province, territory, region, or country where the user resides. A user may also indicate that a download should be prioritized over other network traffic or voice data should be prioritized over any other traffic. The computing system might analyze header data of one or more data packets to determine whether a user has indicated at least one of a specific location to save data, one or more routes to transmit network traffic, one or more resources to utilize, or network traffic to prioritize, and/or the like.

The environmental event causing network traffic to be created across the one or more network nodes or utilization of the one or more network nodes, might include, without limitation, at least one of a storm, a fire, a hurricane, a tornado, a flood, an earthquake, a tsunami, a thunderstorm, a snowstorm, or a rockslide, and/or the like. The emergency event causing network traffic to be created across the one or more network nodes or utilization of the one or more network nodes, might include, without limitation, at least one of a fire, a medical emergency, a police emergency, a storm, a hurricane, a tornado, a flood, an earthquake, a tsunami, a thunderstorm, a snowstorm, or a rockslide, and/or the like. In a non-limiting example, the computing system might prioritize data received from geographic locations associated with an environmental event or an emergency event over data receive from geographic locations unassociated with the environmental event or the emergency event.

The anticipated increase in at least one of the network traffic across the one or more network nodes or the utilization of the one or more network nodes, might include, at least one of an anticipated increase in the number of users in one location or an anticipated increase in the utilization of resources in one location, and/or the like. The computing system might make additional resources available to locations where there is an anticipated increase in the number of users or an anticipated increase in the utilization of resources.

In some embodiments, adjusting, with the computing system, at least one of the routing of the network traffic across the one or more network nodes or the utilization of the one or more network nodes, based at least in part on the second demand classification might include, without limitation, at least one of: (1) sending, with the computing system, a technician to repair or add one or more network nodes based at least in part on the second demand classification; (2) load balancing, with the computing system, the network traffic over the one or more network nodes based at least in part on the second demand classification; (3) prioritizing, with the computing system, the network traffic based at least in part on the second demand classification; (4) rerouting, with the computing system, the network traffic based at least in part on the second demand classification; (5) creating, with the computing system, one or more parallel paths through a network based at least in part on the second demand classification; (6) filtering out, with the computing system, duplicative network traffic based at least in part on the second demand classification; and/or the like.

In some cases, the method might further include determining, with the computing system, whether the at least one trigger event is occurring based at least in part on utilization of one of a block sampling technique or a sliding window sampling technique. In some instances, the sampling interval for block sampling or for sliding window sampling may be 8 seconds or less.

In various instances, the method might additionally include estimating, with the computing system, at least one of an amount of anticipated network traffic across the one or more network nodes or an amount of anticipated utilization of the one or more network nodes based at least in part on the at least one trigger event; and based on the at least one of the estimated amount of anticipated network traffic across the one or more network nodes or the estimated amount of anticipated utilization of the one or more network nodes, adjusting, with computing system, at least one of the routing of the network traffic across the one or more network nodes or the utilization of the one or more network nodes, based at least in part on the second demand classification associated with the at least one trigger event.

In some instances, the trigger event may be associated with a plane of network traffic routing network traffic across the one or more network nodes or utilizing the one or more network nodes. The plane of the network traffic may include at least one of a management plane, a control plane, or a data plane, and/or the like.

In some instances, the computing system might determine at least one of a first part of the network traffic associated with the trigger event across the one or more network nodes or a first set of the one or more network nodes associated with the trigger event. Next, the computing system might determine at least one of a second part of the network traffic unassociated with the trigger event across the one or more network nodes or a second set of the one or more network nodes unassociated with the trigger event. The method may then include adjusting at least one of the routing of the first part of the network traffic associated with the trigger event across the one or more network nodes or the utilization of the first set of the one or more network nodes associated with the trigger event, based at least in part on one or more first rules contained within the second demand classification and maintaining at least one of the routing of the second part of the network traffic unassociated with the trigger event across the one or more network nodes or the utilization of the second set of the one or more network nodes unassociated with the trigger event based at least in part on one or more second rules contained within the second demand classification. The one or more second rule may be different from the one or more first rules and the same as one or more third rules contained within the first demand classification.

In some cases, the computing system might determine whether one or more network nodes may be shared among different demand classifications. The computing system might determine a total amount of bandwidth associated with the one or more network nodes. Next, the computing system might determine which demand classification (i.e., the first demand classification or the second demand classification, or the like) should be prioritized. Based on the determination that the second demand classification should be prioritized, the computing system might determine an amount of bandwidth needed to adjust at least one of the routing of the first part of the network traffic associated with the trigger event across the one or more network nodes or the utilization of the first part of the one or more network nodes associated with the trigger event, based at least in part on the one or more first rules contained within the second demand classification.

Based on a determination that the amount of bandwidth needed to prioritize the second demand classification is less than the total amount of bandwidth associated with the at least one network node of the one or more network nodes, the computing system might share at least one of the routing of the first part of the network traffic associated with the trigger event across the one or more network nodes or the utilization of the one or more network nodes associated with the trigger event, based at least in part on one or more first rules contained within the second demand classification with at least one of the routing of the second part of the network traffic unassociated with the trigger event across the one or more network nodes or the utilization of the second part of the one or more network nodes unassociated with the trigger event based at least in part on one or more second rules. The one or more second rules may be different from the one or more first rules and the same as one or more third rules contained within the first demand classification.

Based on a determination that the amount of bandwidth needed to prioritize the second demand classification is equal to or more than the total amount of bandwidth associated with the at least one network node of the one or more network nodes, the computing system might only allow at least one of the routing of the first part of the network traffic associated with the trigger event across the one or more network nodes or the utilization of the first part of the one or more network nodes associated with the trigger event, based at least in part on one or more first rules contained within the second demand classification. The network traffic unassociated with the trigger event may be rerouted and/or delayed until the network traffic associated with the trigger event has been serviced.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: monitor at least one of network traffic across one or more network nodes or utilization of the one or more network nodes, wherein at least one of routing of the network traffic across the one or more network nodes or utilization of the one or more network nodes is controlled based at least in part on a first demand classification; determine whether at least one trigger event associated with a second demand classification has occurred; and in response to a determination that the at least one trigger event has occurred, adjust at least one of the routing of the network traffic across the one or more network nodes or the utilization of the one or more network nodes, based at least in part on the second demand classification.

In yet another aspect, a system might comprise one or more network nodes and a computing system communicatively coupled to the one or more network nodes. The computing system might comprise at least one processor and a non-transitory computer readable medium communicatively coupled to the at least one processor. The non-transitory computer readable medium might have stored thereon computer software comprising a set of instructions that, when executed by the at least one processor, causes the computing system to: monitor at least one of network traffic across one or more network nodes or utilization of the one or more network nodes, wherein at least one of routing of the network traffic across the one or more network nodes or utilization of the one or more network nodes is controlled based at least in part on a first demand classification; determine whether at least one trigger event associated with a second demand classification has occurred; and in response to a determination that the at least one trigger event has occurred, adjust at least one of the routing of the network traffic across the one or more network nodes or the utilization of the one or more network nodes, based at least in part on the second demand classification.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-7 illustrate some of the features of the method, system, and apparatus for implementing routing of network traffic across one or more network nodes or utilization of the one or more network nodes, and, more particularly, to methods, systems, and apparatuses for implementing routing of network traffic across the one or more network nodes or utilization of the one or more network nodes based on one or more demand classifications and/or based on detection of a trigger event associated with the one or more demand classifications, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a schematic diagram of a system 100 for implementing routing of network traffic across one or more network nodes or utilization of the one or more network nodes, in accordance with various embodiments. In some cases, the routing of network traffic across one or more network nodes might include switching of network traffic across one or more network nodes.

In the non-limiting embodiment of FIG. 1, system 100 might comprise one or more computing systems 105, one or more network nodes 110, one or more source devices 115, one or more destination devices 120, and one or more networks 125a, 125b, 125c, and 125d (collectively, "networks 125" or the like). In some embodiments, the one or more computing systems 105 might be incorporated within at least one of the one or more network nodes 110, the one or more source devices 115, or the one or more destination devices 120, and/or the like. In other embodiments, the one or more computing systems 105 might be separate from the one or more network nodes 110, the one or more source devices 115, or the one or more destination devices 120.

In various embodiments, the one or more computing systems 105 may include hardware, software, or a combination of hardware and software, both physical and/or virtualized. For example, in some embodiments, the one or more computing systems 105 may refer to a software agent or probe which may be deployed in either a centralized or distributed configuration. For example, in some embodiments, the one or more computing systems 105 may be deployed on a centralized server, controller, or other computer system. In other embodiments, the one or more computing systems 105 may be deployed in a distributed manner, across one or more nodes 110, one or more source devices 115, one or more destination devices 120, or one or more computer systems, such as servers, controllers, orchestrators, or other types of network elements, and/or the like. Accordingly, the one or more computing systems 105 may be implemented on, without limitation, one or more desktop computer systems, server computers, dedicated custom hardware appliances, programmable logic controllers, single board computers, field programmable gate arrays ("FPGA"), application specific integrated circuits ("ASIC"), or a system on a chip ("SoC"), and/or the like.

In some cases, the one or more computing systems 105 may include a machine learning engine, agent, or other machine learning device. The one or more computing systems 105 may utilize one or more machine learning techniques or algorithms to control the routing of network traffic across one or more network nodes 110 or the utilization of the one or more network nodes 110.

The one or more network nodes 110 might include, without limitation, at least one of one or more service provider computers, one or more service provider devices, one or more user computers, one or more user devices, one or more consumer grade equipment, and/or the like. A service provider computer, a service provider device, a user computer, a user device, and/or a consumer grade equipment can be a general purpose computer (including, merely by way of example, a desktop computer, a tablet computer, a laptop computer, a handheld computer, and/or the like), a computing device (e.g., a residential gateway, a business gateway, a virtual gateway, a game console, a mobile device, a personal digital assistant, a smart watch, and/or the like), cloud computing devices, a server(s), and/or a workstation computer(s), etc. Network nodes 110 may all be identical with similar processing power. Alternatively, network nodes 110 may be dissimilar hardware that are communicatively coupled together via a wired and/or wireless connection.

In some cases, the one or more source devices 115 and/or destination devices 120 might be incorporated within at least one of the one or more network nodes 110. In other embodiments, the one or more source devices 115 and/or destination devices 120 might be separate from the one or more network nodes 110. The one or more source devices 115 and/or destination devices 120 may be associated with one or more users. Alternatively, the one or more source devices 115 and/or destination devices 120 may be located in a service provider network.

The source device(s) 115 in various cases might represent the source of network traffic, while the destination device(s) 120 might represent the destination for network traffic. However, the computing system 105 and/or network node(s) 110 might also be the source of network traffic and/or the destination for network traffic.

In various instances, the one or more computing systems 105, the one or more network nodes 110, the one or more source devices 125, or the one or more destination devices 130 might be located and communicatively coupled together in a service provider network. Alternatively, the one or more computing systems 105 and/or the one or more network nodes 110 might be located and communicatively coupled together in a service provider network (e.g., networks 125a and 125b, or the like) and the one or more source devices 125 or the one or more destination devices 130 might be communicatively coupled with the one or more computing systems 105, the one or more network nodes 110 via one or more access networks 125c and 125d.

In operation, the computing system 105 may be configured to optimize fairness routines across a given population or demographic of users or customers of a service provider network based on detection of abnormal or atypical network traffic. The abnormal or atypical network traffic may be associated with a trigger event. Accordingly, the computing system 105 may be configured to detect one or more trigger events and to determine one or more demand classifications associated with the one or more trigger events. A demand classification may set forth one or more rules for fairly routing the network traffic across the one or more network nodes 110 or utilizing the one or more network nodes 110.

In various instances, one or more demand classifications may be defined, adjusted, or otherwise determined. For example, in some embodiments, a demand classification may include, without limitation, a classification of various groupings of devices (both physical and virtual), a classification of various customers, a classification of various traffic flows, a classification of various environmental or emergency events creating traffic within network(s) 125, and/or the like, each of which might demand a shared resource(s). In some embodiments, based on a determination that the trigger event has occurred, the computing system 105 may further be configured to adjust the routing of the network traffic across the one or more network nodes 110 or utilization of the one or more network nodes 110, based at least in part on a determined demand classification associated with the trigger event.

Demand classification of network traffic or utilization of network nodes 110 includes classification of anything of interest to the network or the user such as system upgrade, backup, file transfer, movie transfer, or any other type of traffic where a customer and/or network controller might be interested in knowing the demand and wish to take actions to grant better fairness to that traffic in order to manage the users or network services in a more advanced manner than the static QoS mechanisms are designed to handle those demands. It should be noted that a customer has the capability to preset action changes associated with demand classification triggers to change the QoS of the network automatically when the traffic associated with the demand classification occurs. Alternatively, the computing system may be configured to automatically change the demand classification based on detecting traffic associated with a demand classification. In other words, the computing system 105 may reactively change the settings when it detects a trigger indicating the demand classification condition.

Therefore, in operation, the computing system 105 may monitor at least one of network traffic across one or more network nodes 110 or utilization of the one or more network nodes 110. In alternative embodiments, the computing system might monitor traffic across one or more links or segments connecting or bridging one or more network nodes. For ease of description, controlling of routing traffic across one or more network nodes 110 is described below. However, similar methods and techniques may be used to control routing of traffic across one or more links or segments connecting or bridging the one or more network nodes 110.

The at least one of routing of the network traffic across the one or more network nodes or utilization of the one or more network nodes may be controlled based at least in part on a first demand classification. The first demand classification may be a default demand classification that includes one or more rules for controlling routing of network traffic or utilizing network nodes that is unassociated with a trigger event. In other words, the first demand classification may control at least one of the routing of the network traffic across the one or more network nodes that is unassociated with a trigger event or the utilization of the one or more network nodes that is unassociated with a trigger event.

The computing system 105 may then determine whether at least one trigger event associated with a second demand classification has occurred. In response to a determination that the at least one trigger event has occurred, the computing system 105 might adjust at least one of the routing of the network traffic across the one or more network nodes 110 or the utilization of the one or more network nodes 110, based at least in part on the second demand classification. The second demand classification might include one or more rules for controlling routing of network traffic or utilizing network nodes that is associated with a trigger event. In some cases, only the routing of network traffic associated with the trigger event or the utilization of one or more network nodes 110 associated with the trigger event is adjusted based on the second demand classification, while the routing of network traffic that is unassociated with the trigger event or the utilization of the one or more network nodes 110 that are unassociated with the trigger event continues to be routed or utilized based on the first demand classification. Thus, in some cases, a first part of the network traffic that is associated with the trigger event may be routed based on the second demand classification while a second part of the network traffic that is unassociated with the trigger event is routed based on first demand classification. Additionally and/or alternatively, a first part of the one or more nodes 110 associated with the trigger event may be utilized based on the second demand classification while a second part of the one or more network nodes 110 that are unassociated with the trigger event are utilized based on the first demand classification. In other words, at least two demand classifications may be used to control routing of network traffic or utilization of the one or more network nodes 110.

Additionally and/or alternatively, the second demand classification might contain a first set of rules for routing network traffic associated with the trigger event or utilizing one or more network nodes 110 associated with the trigger event. The second demand classification might further contain a second set of rules, different from the first set of rules, to control routing of network traffic unassociated with the trigger event or the utilization of one or more network nodes 110 unassociated with the trigger event. The second set of rules may be the same as or similar to one or more rules contained within the first demand classification.

These and other aspects of the various embodiments are described in detail below with respect to FIGS. 2-7.

Figure 2:
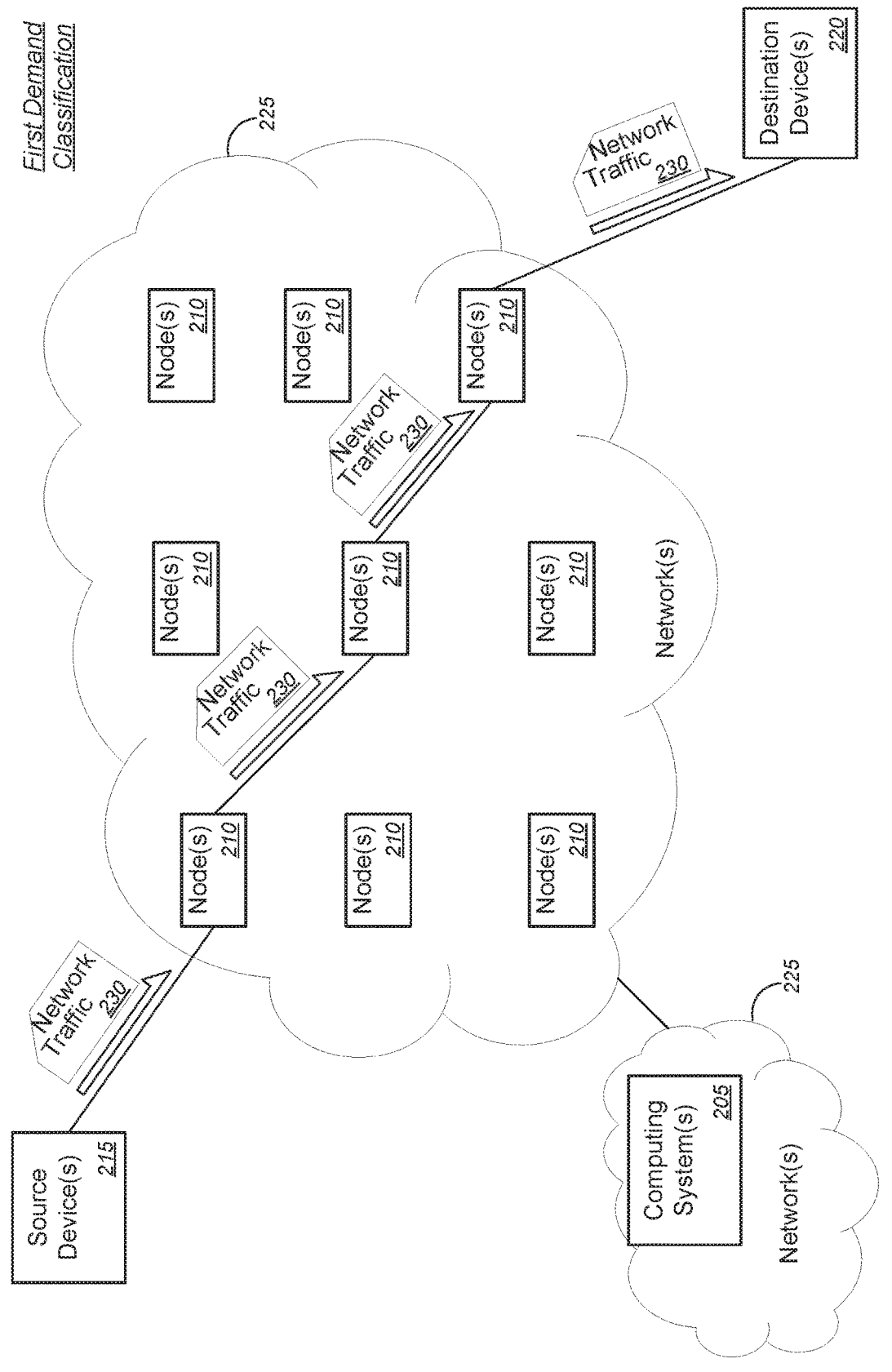
FIG. 2 is a schematic diagram of a system for implementing routing of network traffic across one or more network nodes or utilization of the one or more network nodes based on a first demand classification, in accordance with various embodiments.
Figure 3:
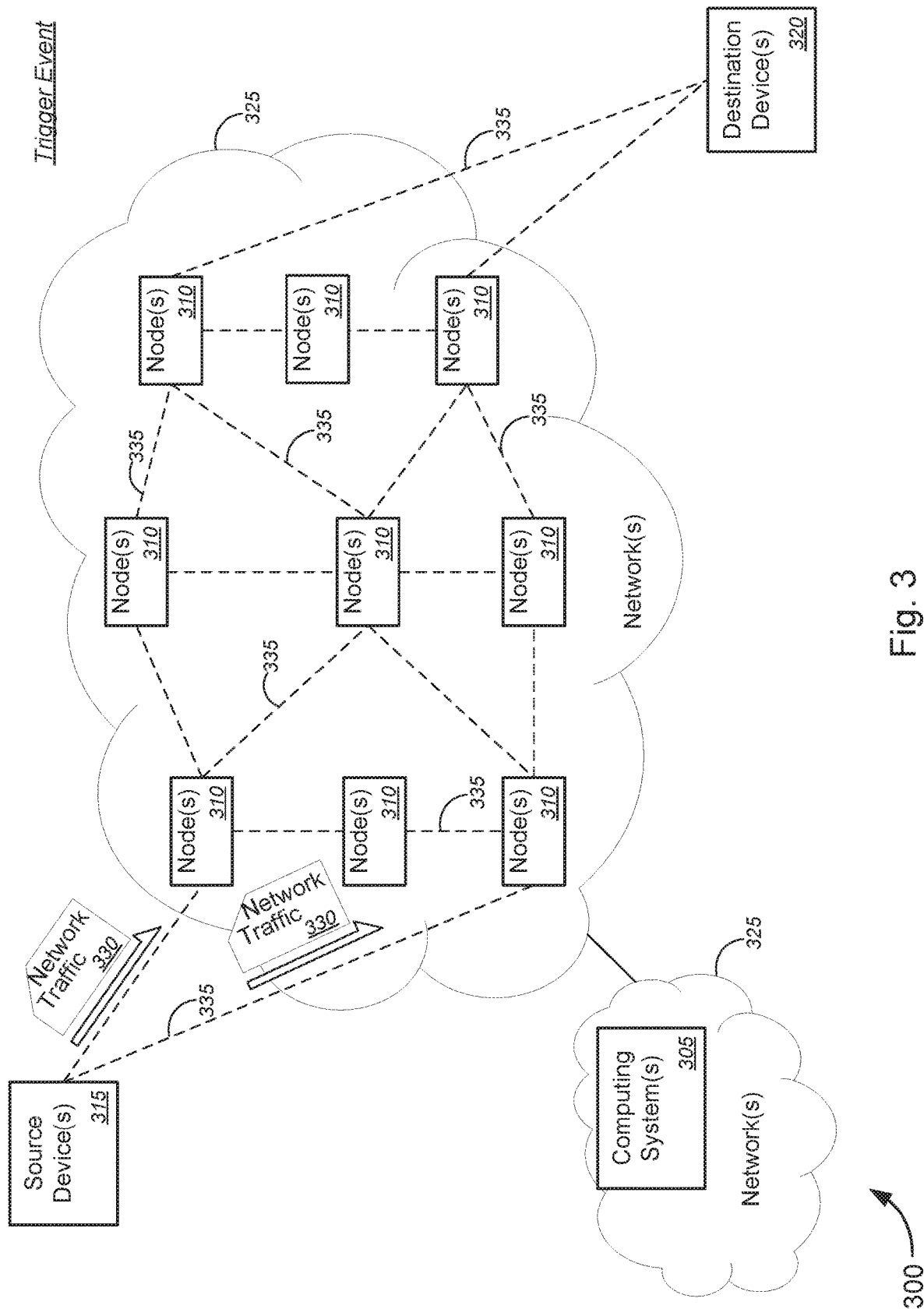
FIG. 3 is a schematic diagram of a system for implementing routing of network traffic across one or more network nodes or utilization of the one or more network nodes based on detection of a trigger event, in accordance with various embodiments.
Figure 4:
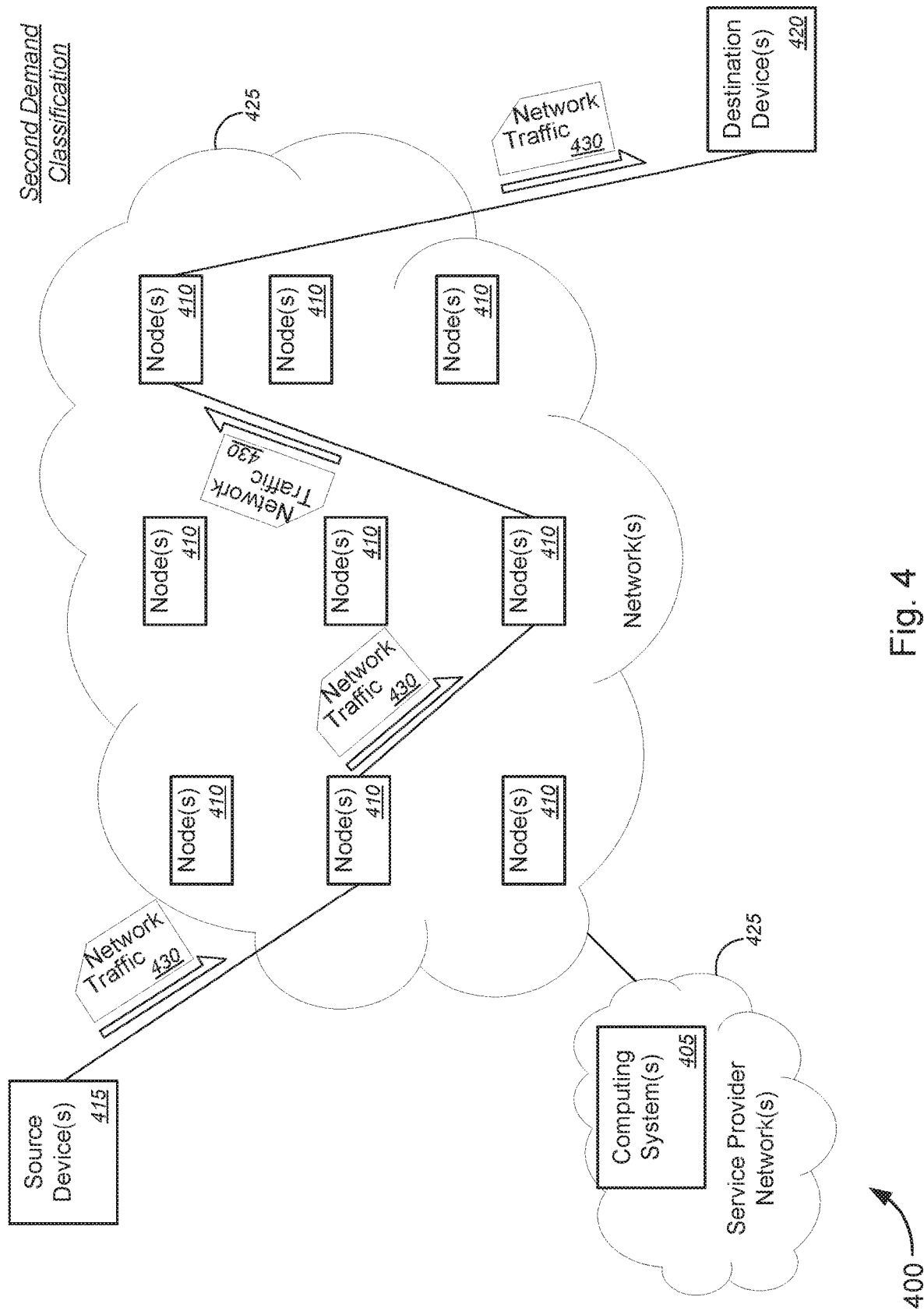
FIG. 4 is a schematic diagram of a system for implementing routing of network traffic across one or more network nodes or utilization of the one or more network nodes based on a second demand classification, in accordance with various embodiments.

FIGS. 2-4 are schematic diagrams similar to system 100 for implementing routing of network traffic across one or more network nodes or utilization of the one or more network nodes based on a first demand classification (FIG. 2), based on detection of a trigger event (FIG. 3), and based on a second demand classification (FIG. 4), in accordance with various embodiments.

FIG. 2 is a schematic diagram of a system 200 for implementing routing of network traffic across one or more network nodes or utilization of the one or more network nodes based on a first demand classification, in accordance with various embodiments.

In the non-limiting embodiment of FIG. 2, system 200 might comprise one or more computing systems 205 (which may correspond to one or more computing systems 105 of FIG. 1, or the like), one or more network nodes 210 (which may correspond to one or more network nodes 110 of FIG. 1, or the like), one or more source devices 215 (which may correspond to one or more source devices 115 of FIG. 1, or the like), one or more destination devices 220 (which may correspond to one or more destination devices 120 of FIG. 1, or the like), and one or more networks 225 (which may correspond to one or more networks 125 of FIG. 1, or the like).

In FIG. 2, network traffic 230 might be routed through the one or more network nodes 210 and/or the one or more networks 225 based on a first demand classification. Further, although not shown, the one or more network nodes 210 might also be utilized according to the first demand classification.

The first demand classification may be a default demand classification that routes normal or typical network traffic through the one or more network nodes 210 and/or the one or more networks 225 and/or utilizes the one or more network nodes 210 in a typical manner. In other words, the first demand classification may be unassociated with a trigger event. In a non-limiting example, the first demand classification may correspond to a standard quality of service ("QoS") classification that controls the routing of the network traffic 230 across the one or more network nodes 210 or utilization of the one or more network nodes 210. The first demand classification may be associated with one or more first rules for controlling at least one of routing of the network traffic 230 across the one or more network nodes 210 or utilization of the one or more network nodes 210.

In some cases, the network traffic 230 across the one or more network nodes 210 might include at least one of data traffic, audio traffic, or video traffic. Additionally and/or alternatively, the network traffic 230 may be associated with at least one of a residential user, a residential premises, a business user, a business premises, an emergency responder, and/or the like. Additionally, the network traffic 230 might be associated with different planes of traffic over a network. For example, the network traffic 230 may be associated with at least one of a management plane, a control plane, or a data plane, and/or the like.

While routing network traffic 230 across one or more nodes 210 or utilizing one or more nodes 210 according to a first demand classification, computing system 205 might monitor at least one of network traffic 230 across one or more network nodes 210 or utilization of the one or more network nodes 210 for a trigger event associated with at least one of abnormal or atypical network traffic across one or more network nodes 210 or abnormal or atypical utilization of the one or more network nodes 210.

FIG. 3, outlined below, describes what happens when the computing system 205 detects a trigger event associated with abnormal traffic.

FIG. 3 is a schematic diagram of a system 300 for implementing routing of network traffic across one or more network nodes or utilization of the one or more network nodes based on detection of a trigger event, in accordance with various embodiments.

In the non-limiting embodiment of FIG. 3, system 300 might comprise one or more computing systems 305 (which may correspond to one or more computing systems 105 or 205 of FIG. 1 or 2, respectively, or the like), one or more network nodes 310 (which may correspond to one or more network nodes 110 or 210 of FIG. 1 or 2, respectively, or the like), one or more source devices 315 (which may correspond to one or more source devices 115 or 215 of FIG. 1 or 2, respectively, or the like), one or more destination devices 320 (which may correspond to one or more destination devices 120 or 220 of FIG. 1 or 2, respectively, or the like), and one or more networks 325 (which may correspond to one or more networks 125 or 225 of FIG. 1 or 2, respectively, or the like).

Computing system 305 might monitor at least one of network traffic 330 across one or more network nodes 310 or utilization of the one or more network nodes 310 for one or more trigger events associated with at least one of abnormal or atypical network traffic across one or more network nodes 310 or abnormal or atypical utilization of the one or more network nodes 310. In some cases, the trigger event may only be associated with a part of the network traffic or a part of the one or more network nodes 110.

The at least one trigger event might include, without limitation, at least one of a failure of the one or more network nodes 310, a customer creating network traffic 330 across the one or more network nodes 310 or utilizing the one or more network nodes 310, a user event creating network traffic 330 across the one or more network nodes 310 or utilizing the one or more network nodes 310, an environmental event causing network traffic 330 to be created across the one or more network nodes 310 or utilization of the one or more network nodes 310, an emergency event causing network traffic 330 to be created across the one or more network nodes 310 or utilization of the one or more network nodes 310, a location event 330 creating network traffic across the one or more network nodes 310 or utilizing the one or more network nodes 310, an unanticipated increase in at least one of the network traffic 330 across the one or more network nodes 310 or the utilization of one or more network nodes 310, or an anticipated increase in at least one of the network traffic 330 across the one or more network nodes 310 or the utilization of the one or more network nodes 310, and/or the like.

The customer creating network traffic 330 across the one or more network nodes 310 or utilizing the one or more network nodes 310 might include, without limitation, at least one of one or more emergency responders, one or more business customers, one or more government customers, one or more residential customers, one or more devices, one or more machine-to-machine devices, or one or more Internet of Things ("IoT") devices, and/or the like.

The user event creating network traffic 330 across the one or more network nodes 310 or utilizing the one or more network nodes 310 might include, without limitation, at least one of a user indicating a specific location to save data, a user indicating one or more routes to transmit network traffic, a user indicating one or more resources to utilize, or a user indicating network traffic to prioritize, and/or the like.

The environmental event causing network traffic 330 to be created across the one or more network nodes 310 or utilization of the one or more network nodes 310 might include, without limitation, at least one of a storm, a fire, a hurricane, a tornado, a flood, an earthquake, a tsunami, a thunderstorm, a snowstorm, or a rockslide, and/or the like. The emergency event causing network traffic 330 to be created across the one or more network nodes 310 or utilization of the one or more network nodes 310 might include, without limitation, at least one of a fire, a medical emergency, a police emergency, a storm, a hurricane, a tornado, a flood, an earthquake, a tsunami, a thunderstorm, a snowstorm, or a rockslide, and/or the like.

The location event causing network traffic 330 to be created across the one or more network nodes 310 or utilization of the one or more network nodes 310 might include, without limitation, at least one of a sporting event (e.g., a game, a tournament, a competition, etc.), a theatrical performance, a concert, a political event, a parade, a meeting, a school event, or a location with a large amount of users creating traffic on networks 325 or utilizing one or more nodes 310, and/or the like.

The anticipated increase in at least one of the network traffic 330 across the one or more network nodes 310 or the utilization of the one or more network nodes 310 might include, without limitation, at least one of an anticipated increase in the number of users in one location or an anticipated increase in the utilization of resources in one location, and/or the like.

In some embodiments, the one or more trigger events may be associated with a plane of network traffic across the one or more network nodes 310 or utilizing the one or more network nodes 310. The plane of the network traffic might include, without limitation, at least one of a management plane, a control plane, or a data plane, and/or the like. Similarly, trigger events associated with at least one of the management plane, control plane, and/or data plane may include trigger events based on traffic segmentation methods, such as physical methods (e.g., remote monitoring at the port level, or the like), logical methods (e.g., utilizing virtual local area network (VLAN), MPLS, tunnels, and/or the like), and virtual methods (e.g., utilizing virtual network interface cards, etc.). In this manner, physical, logical, and/or virtual traffic may be monitored for each of the management, control, and/or data planes, vertically across the entire network 325.

The computing system 305 might detect the one or more trigger events using one or more different approaches. One or more trigger events may be determined automatically by the computing system 305. Network traffic, data packets, and/or bandwidth utilization corresponding to each of the one or more trigger events may be tracked by the computing system 305 to determine whether a trigger event is occurring or has occurred. In various embodiments, the computing system 305 might determine an adjustable observation window. The computing system 305 may be configured to determine both a type and an interval of an observation window. To determine whether one or more trigger events have occurred, a meaningful period of time may be determined that is specific to each of the above determined trigger events.

For example, each trigger event may correspond to a different, respective, observation window. In some embodiments, the observation window may be a few seconds, or in other examples, the observation window may be yearly. Thus, in some examples, a block sampling technique may be utilized by the computing system 305 to observe a demand for one or more nodes 310, as well as to observe a utilization of one or more nodes 310 by each of a plurality of trigger events. For example, one sample may be derived or calculated at the end of every observation window. Alternatively, in other embodiments in which data and/or the resource may be analog or more similar to analog data, a sliding window may be utilized. Using a sliding window, a moving average may be produced periodically over the observation window. For example, an observation window may be 8 seconds long, and a shift register of 8-second averages (e.g., looking at 8 seconds worth of data, or the like) may be utilized to produce samples every second, fraction of a second, or other length of time shorter than the observation window. Accordingly, a type of observation window may refer to a sampling technique to be utilized, while an interval of the observation may refer to the length of time of the observation window.

Demand for the resource(s), such as traffic and/or bandwidth, may be tracked by the computing system 305 at points of ingress of the one or more network nodes 310, one or more source devices 315, and/or destination devices 320, and the like. Resource utilization may be tracked at points of egress of the one or more network nodes 310, one or more source devices 315, and/or destination devices 320. In this way, computing system 305 may automatically determine demand for resources as well as resource utilization within the network.

One key output metric for tracking utilization is the "ability to consume," or the average throughput per cycle. This metric is critical to adjusting bandwidth allotments in order to not "over-serve" the traffic associated with the trigger event above traffic that is unassociated with the trigger event. If the smallest scheduler window is set to the "ability to consume" from all traffic sources then no scheduler overhead is wasted while trying to serve all the flows. This is especially true for the demand traffic of interest. Therefore, basing the action taken on the "ability to consume" bandwidth and making on the fly adjustments to the schedule provides the ability to apply non-static QoS fairness, but not waste bandwidth due to un-used bandwidth scheduling.

In other embodiments, the computing system 305 may determine that a trigger event is occurring based on user input. A trigger event may be initiated by a user of a source device 315. The computing system 305 may be configured to allow a user and/or administrator to define various trigger events indicative of at least one of abnormal or atypical network traffic 330 across one or more network nodes 310 or abnormal or atypical utilization of the one or more network nodes 310. In some embodiments, the computing system 305 may be configured to allow a user to manually activate a trigger. A user indication of one or more trigger events may be contained within a header of a packet.

In yet other embodiments, a trigger event may be detected based on the source of the network traffic 330 routed across one or more nodes 310 or based on utilizing the one or more nodes 310. For example, if the network traffic 330 is sent from one or more first responder devices, computing system 305 may determine that a trigger event has occurred.

Accordingly, the computing system 305 may be configured automatically or by a user to define at least one of input data (e.g., performance metrics, bandwidth utilization, etc.), threshold conditions for the one or more input data, and/or patterns of behavior in the one or more input data, to define a trigger event. In yet further embodiments, trigger events may be configured to include external sources of data and/or metadata indicative of a scheduled or anticipated event which may cause abnormal network traffic or demand for and/or utilization of one or more network nodes 310.

The one or more trigger events may be associated with one or more second demand classifications. The one or more second demand classifications might have one or more rules for handling abnormal or atypical network traffic 330 or abnormal or atypical utilization of network nodes 310 associated with the one or more trigger events. In a non-limiting example, based on detection of one or more trigger events, computing system 305 might look up one or more second demand classifications for handling the trigger event. In some cases, the second demand classification might have a first set of rules for handling abnormal or atypical network traffic 330 associated with the one or more trigger events or abnormal or atypical utilization of network nodes 310 associated with the one or more trigger events. The second demand classification might have a second set of rules for handling network traffic that is unassociated with the one or more trigger events or utilization of network nodes 310 that is unassociated with the one or more trigger events. The second set of rules might be different from the first set of rules and might be the same as one or more third set of rules contained within the first demand classification. In other words, the second demand classification might contain one or more second rules for handling network traffic that is unassociated with the one or more trigger events or utilization of network nodes 310 that is unassociated with the one or more trigger events based on the first demand classification.

The computing system 305 might cause the network traffic 330 associated with the trigger event to be routed through nodes 310 or to utilize nodes 310 in a different manner than the typical network traffic shown in FIG. 2. This is represented by the dotted lines 335 of FIG. 3.

Accordingly, the computing system 305 may be configured to determine whether a trigger event has occurred based on the tracked input data associated with network traffic 330, based on demand for one or more nodes 310, and/or based on utilization of one or more nodes 310, as described above. In response to determining that a trigger event has occurred, the computing system 305 may determine an appropriate reaction to the occurrence of the trigger event. In various embodiments, the computing system 305 may automatically adjust or define a reaction, or the computing system 305 may be configured to allow a user to adjust or define a reaction. Reactions may include one or more second demand classifications comprising one or more fairness of outcome control algorithms for adjusting and/or modifying how a resource is utilized and/or how network traffic is routed. On one extreme, a fairness of outcome control algorithm may provide strict fairness, in which an outcome provided to each demographic/demand classification is equally shared. On the other extreme, fairness of outcome may provide individual fairness, in which resources are provided on an individual basis without regard to the needs of the entire demographic (e.g., no adjustment to fairness of outcome). The computing system 305 may then implement the second demand classification control to network traffic or resource utilization associated with the one or more trigger events. These reactions, modifications, and/or adjustments to the network traffic 330 and/or utilization of network nodes 310 are further discussed below with respect to FIG. 4.

FIG. 4 is a schematic diagram of a system for implementing routing of network traffic across one or more network nodes or utilization of the one or more network nodes based on a second demand classification, in accordance with various embodiments.

In the non-limiting embodiment of FIG. 4, system 400 might comprise one or more computing systems 405 (which may correspond to one or more computing systems 105, 205, or 305 of FIG. 1, 2, or 3, respectively, or the like), one or more network nodes 410 (which may correspond to one or more network nodes 110, 210, or 310 of FIG. 1, 2, or 3, respectively, or the like), one or more source devices 415 (which may correspond to one or more source devices 115, 215, or 315 of FIG. 1, 2, or 3, respectively, or the like), one or more destination devices 420 (which may correspond to one or more destination devices 120, 220, or 320 of FIG. 1, 2, or 3, respectively, or the like), and one or more networks 425 (which may correspond to one or more networks 125, 225, or 325 of FIG. 1, 2, or 3, respectively, or the like).

As shown in FIG. 4, the network traffic 430 and/or the utilization of the one or more network nodes 410 may be adjusted based on the one or more second demand classifications associated with the one or more trigger events. The one or more second demand classifications may contain one or more rules and/or fairness algorithms for adjusting or modifying the routing of network traffic 430 across one or more nodes 410 and/or for adjusting or modifying the utilization of one or more nodes 410.

In some cases, only routing of the network traffic or the utilization of the one or more nodes associated with the trigger event is adjusted based on the second demand classification, while the routing of the network traffic or the utilization of the one or more nodes unassociated with the trigger event continues to be routed or utilized based on the first demand classification. Alternatively, the second demand classification might contain one or more rules that are different from the one or more rules contained within the first demand classification to adjust routing of the network traffic or the utilization of the one or more nodes associated with the trigger event while maintaining the routing of the network traffic or the utilization of the one or more nodes that are unassociated with the trigger event based on the first demand classification.

The one or more adjustments or modifications based on the second demand classification might include, without limitation: (1) sending, with the computing system 405, a technician to repair or add one or more network nodes 410 based at least in part on the second demand classification; (2) load balancing, with the computing system 405, the network traffic 430 over the one or more network nodes 410 based at least in part on the second demand classification; (3) prioritizing, with the computing system 405, the network traffic 430 based at least in part on the second demand classification; (4) prioritizing, with the computing system 405, utilization of the one or more nodes 410 based at least in part on the second demand classification; (5) rerouting, with the computing system 405, the network traffic 430 based at least in part on the second demand classification; (6) creating, with the computing system 405, one or more paths through a network based at least in part on the second demand classification; (7) creating, with the computing system 405, one or more parallel paths through a network based at least in part on the second demand classification; (8) filtering out, with the computing system 405, duplicative network traffic based at least in part on the second demand classification; or (9) based on the anticipated amount of network traffic or utilization, adjusting, with computing system, at least one of the routing of the network traffic across the one or more network nodes or the utilization of the one or more network nodes based at least in part on the second demand classification; and/or the like.

Several non-limiting examples are detailed below for adjusting and/or modifying at least one of the routing of network traffic 430 across one or more network nodes 410 or the utilization of the one or more network nodes 410 based on detection of a trigger event associated with a second demand classification.

When the at least one trigger event includes a failure of the one or more network nodes, the computing system 405, based on the second demand classification associated with the at least one trigger event, might: (1) send a technician to repair the one or more failed network nodes or add one or more additional network nodes; (2) load balance the network traffic 430 over one or more functioning network nodes; (3) reroute the network traffic 430 around the one or more failed network nodes; and/or the like.

When the at least one trigger event is associated with a customer creating network traffic 430 across the one or more network nodes 410 or utilizing the one or more network nodes 410, the computing system 405, based at least in part on the second demand classification associated with the customer, might: (1) load balance the network traffic 430 over the one or more network nodes 410 based at least in part on the second demand classification associated with the customer; (2) prioritize the network traffic 430 based at least in part on the second demand classification associated with the customer; (3) prioritize utilization of the one or more network nodes 410 based at least in part on the second demand classification associated with the customer; (4) reroute the network traffic 430 based at least in part on the second demand classification associated with the customer; (5) create one or more parallel paths through a network based at least in part on the second demand classification associated with the customer; and/or the like. In a non-limiting example, network traffic generated by one or more first responders may be prioritized over network traffic generated by residential customers or business customers. In another non-limiting example, network traffic generated by residential customers or business customers may be prioritized over network traffic generated by machine-to-machine communications between one or more devices.

When the at least one trigger event is associated with a user event creating network traffic across the one or more network nodes or utilizing the one or more network nodes, the computing system 405, based on the second demand classification associated with the at least one trigger event, might: (1) load balance the network traffic 430 over the one or more network nodes 410 based at least in part on the second demand classification associated with the user event; (2) prioritize the network traffic 430 based at least in part on the second demand classification associated with the user event; (3) prioritize utilization of the one or more network nodes 410 based at least in part on the second demand classification associated with the user event; (4) reroute the network traffic 430 based at least in part on the second demand classification associated with the user event; (5) create one or more paths through a network based at least in part on the second demand classification associated with the user event; (6) create one or more parallel paths through a network based at least in part on the second demand classification associated with the user event; and/or the like. In a non-limiting example, a user might prioritize a download of data over other traffic created over the network. Additionally and/or alternatively, the user may indicate that the network traffic 430 must only be routed through one or more nodes within a country, state, or region or must not be routed through one or more nodes within a particular country, state, or region. In other cases, a user may indicate a specific location (e.g., a specific device, a specific region, a specific state, a specific country, etc.) to save data.

When the at least one trigger event is associated with an environmental event creating network traffic 430 across the one or more network nodes 410 or utilizing the one or more network nodes 410, the computing system 405, based on the second demand classification associated with the at least one trigger event, might: (1) load balance the network traffic 430 over the one or more network nodes 410 based at least in part on the environmental event; (2) prioritize the network traffic 430 based at least in part on the second demand classification associated with the environmental event; (3) prioritize utilization of the one or more network nodes 410 based at least in part on the second demand classification associated with the environmental event; (4) reroute the network traffic 430 based at least in part on the second demand classification associated with the environmental event; (5) create one or more parallel paths through a network based at least in part on the second demand classification associated with the environmental event; (6) filter out duplicative network traffic based at least in part on environmental event; and/or the like. In a non-limiting example, the computing system 405 might prioritize network traffic from locations that are in the path of a storm, a tornado, a flood, and/or the like. The computing system 405 might also filter out duplicative traffic reporting a storm, a tornado, a flood, and/or the like.

When the at least one trigger event is associated with an emergency event creating network traffic 430 across the one or more network nodes 410 or utilizing the one or more network nodes 410, the computing system 405, based on the second demand classification associated with the at least one trigger event, might: (1) load balance the network traffic 430 over the one or more network nodes based at least in part on the second demand classification associated with the emergency event; (2) prioritize the network 430 traffic based at least in part on the second demand classification associated with the emergency event; (3) prioritize utilization of the one or more network nodes 410 based at least in part on the second demand classification associated with the emergency event; (4) reroute the network traffic 430 based at least in part on the second demand classification associated with the emergency event; (5) create one or more parallel paths through a network based at least in part on the second demand classification associated with the emergency event; (6) filter out duplicative network traffic based at least in part on the emergency event; and/or the like. In a non-limiting example, the computing system 405 might prioritize network traffic from locations that are experiencing an emergency event. The computing system 405 might also filter out duplicative traffic reporting an emergency event.

When the at least one trigger event is associated with an unanticipated increase in at least one of the network traffic 430 across the one or more network nodes 410 or the utilization of one or more network nodes 410, the computing system 405, based on the second demand classification associated with the at least one trigger event, might: (1) send a technician to add one or more network nodes based at least in part on the second demand classification associated with the unanticipated increase; (2) load balance the network traffic 430 over the one or more network nodes 410 based at least in part on the second demand classification associated with the unanticipated increase; (3) prioritize the network traffic 430 based at least in part on the second demand classification associated with the unanticipated increase; (4) reroute the network traffic 430 based at least in part on the second demand classification associated with the unanticipated increase; (5) create one or more parallel paths through a network based at least in part on the second demand classification associated with the unanticipated increase; (6) filter out duplicative network traffic 430 based at least in part on the second demand classification associated with the unanticipated increase; and/or the like.

When the at least one trigger event is associated with an anticipated increase in at least one of the network traffic 430 across the one or more network nodes 410 or the utilization of one or more network nodes 410, the computing system 405, based on the second demand classification associated with the at least one trigger event, might: (1) send a technician to add one or more network nodes based at least in part on the second demand classification associated with the anticipated increase; (2) load balance the network traffic 430 over the one or more network nodes 410 based at least in part on the second demand classification associated with the anticipated increase; (3) prioritize the network traffic 430 based at least in part on the second demand classification associated with the anticipated increase; (4) reroute the network traffic 430 based at least in part on the second demand classification associated with the anticipated increase; (5) create one or more parallel paths through a network based at least in part on the second demand classification associated with the anticipated increase; (6) filter out duplicative network traffic based at least in part on the second demand classification associated with the anticipated increase; and/or the like. In a non-limiting example, the computing system 405 might determine whether a sporting event, a theatrical performance, a concert, a political event, a meeting, a parade, a school event, and/or the like is occurring and (1) send a technician to add one or more nodes to accommodate the increased network traffic, (2) prioritize network traffic from the event, (3) create one or more parallel paths through the network to handle the increased traffic, and/or the like. In another non-limiting example, video traffic may be prioritized over voice and/or Internet traffic during a sporting event or other televised event. Accordingly, settings for video traffic may be adjusted to allow greater utilization of one or more nodes 410, while settings for voice and/or Internet traffic may be adjusted to decrease or deprioritize utilization of one or more nodes 410 for the duration of the sporting event.

The computing system 405 might automatically determine whether an anticipated increase is going to occur based at least in part on retrieving information about the anticipated event from the Internet, and/or the like. Alternatively, an administrator and/or customer may inform the computing system 405 of an anticipated increase. Based on the information gathered, the computing system 405 may estimate the amount of increased network traffic and might adjust at least one of the routing of the network traffic across the one or more network nodes or the utilization of the one or more network nodes based at least in part on the second demand classicization associated with an estimated amount of anticipated network traffic 430 across the one or more network nodes 410 or an estimated amount of anticipated utilization of the one or more network nodes 410.

When the at least one trigger event is associated with a plane of network traffic routing network traffic 430 across the one or more network nodes 410 or utilizing the one or more network nodes 410, the computing system 405, based on the second demand classification associated with the at least one trigger event, might: (1) load balance the network traffic 430 over the one or more network nodes based at least in part on the second demand classification associated with the one or more planes; (2) prioritize the network traffic 430 based at least in part on the second demand classification associated with the one or more planes; (3) prioritize utilization of the one or more network nodes 410 based at least in part on the second demand classification associated with the one or more planes; (4) reroute the network traffic 430 based at least in part on the second demand classification associated with the one or more planes; (5) create one or more parallel paths through a network based at least in part on the second demand classification associated with the one or more planes; (6) filter out duplicative network traffic based at least in part on the second demand classification associated with the one or more planes; and/or the like.

In some cases, the computing system 405 might determine whether one or more network nodes 410 may be shared among different demand classifications. The computing system 405 might determine a total amount of bandwidth associated with the one or more network nodes 410. Next, the computing system 405 might determine which demand classification (i.e., the first demand classification or the second demand classification, or the like) should be prioritized. Based on the determination that the second demand classification should be prioritized, the computing system 405 might determine an amount of bandwidth needed to adjust at least one of the routing of the first part of the network traffic associated with the trigger event across the one or more network nodes or the utilization of the first set of the one or more network nodes associated with the trigger event, based at least in part on the one or more first rules contained within the second demand classification.

Based on a determination that the amount of bandwidth needed to prioritize the second demand classification is less than the total amount of bandwidth associated with the one or more network nodes, the computing system 405 might share at least one of the routing of the first part of the network traffic associated with the trigger event across the one or more network nodes or the utilization of the one or more network nodes associated with the trigger event, based at least in part on one or more first rules contained within the second demand classification with at least one of the routing of the second part of the network traffic unassociated with the trigger event across the one or more network nodes or the utilization of the second part of the one or more network nodes unassociated with the trigger event based at least in part on one or more second rules. The one or more second rules may be different from the one or more first rules and the same as one or more third rules contained within the first demand classification.

Based on a determination that the amount of bandwidth needed to prioritize the second demand classification is equal to or more than the total amount of bandwidth associated with the at least one network node of the one or more network nodes, the computing system 405 might only allow at least one of the routing of the first part of the network traffic associated with the trigger event across the one or more network nodes or the utilization of the first part of the one or more network nodes associated with the trigger event, based at least in part on one or more first rules contained within the second demand classification.

In various embodiments, after a second demand classification including one or more fairness of outcome control algorithms have been applied, the computing system 405 may further be configured to audit (e.g., monitor) the outcomes as a result of implementing a respective demand classification. In some embodiments, the computing system 405 might perform one or more checks to ensure that the one or more demand classifications are operating within specified intent-based policies, which is described in detail in the '498 Application (which has already been incorporated herein by reference in its entirety for all purposes).

The computing system 405 might monitor at least one of the adjusted routing of network traffic 430 across the one or more network nodes 410 or adjusted utilization of the one or more network nodes 410 and might determine whether the at least one trigger event associated with the second demand classification has ended. Based on a determination that the at least one trigger event associated with the second demand classification has ended, the computing system 405 might adjust at least one of the routing of the network traffic 430 across the one or more network nodes 410 or the utilization of the one or more network nodes 410, based at least in part on the first demand classification.

Figure 5A:
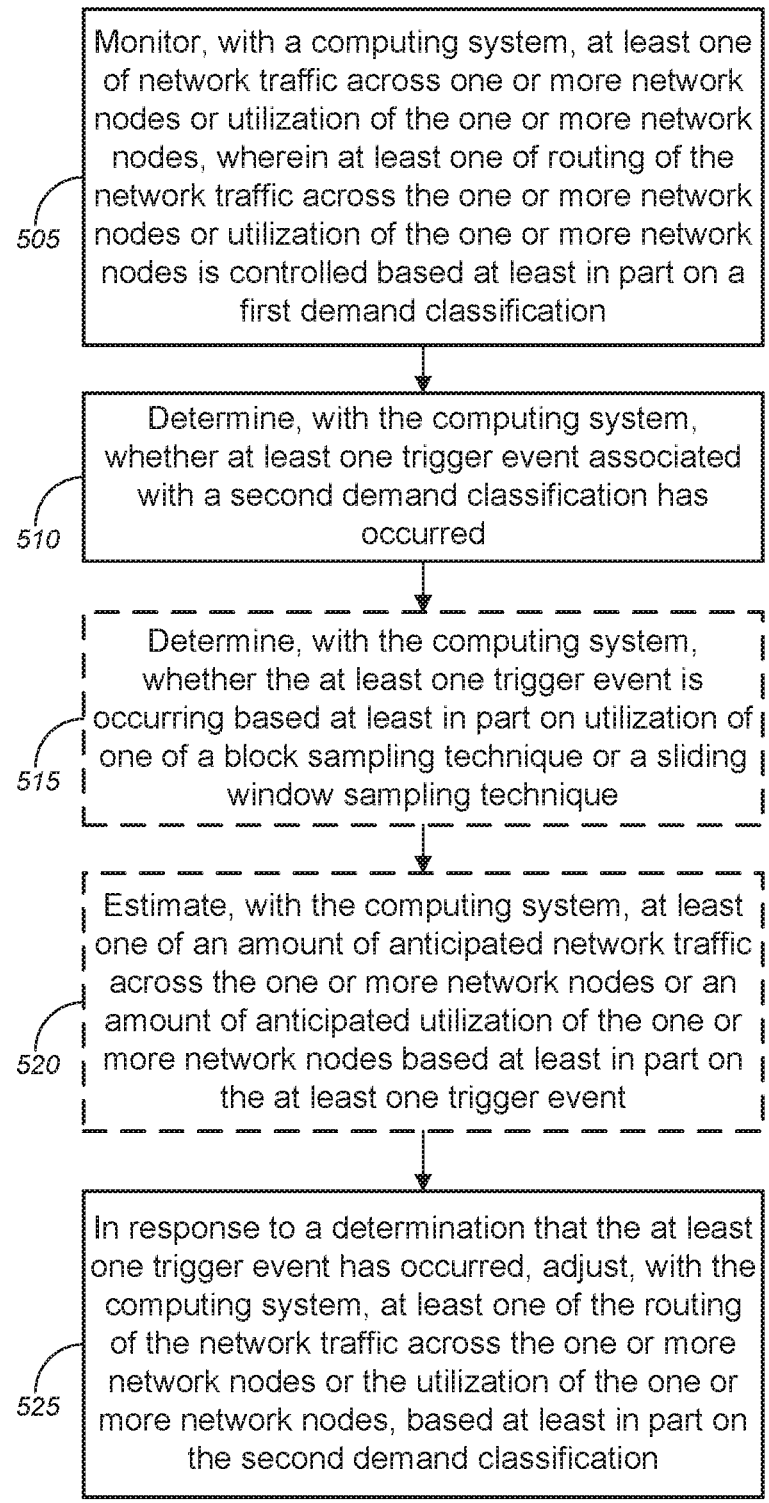
FIGS. 5A-5C are flow diagrams for implementing routing of network traffic across one or more network nodes or utilization of the one or more network nodes, in accordance with various embodiments.
Figure 5B:
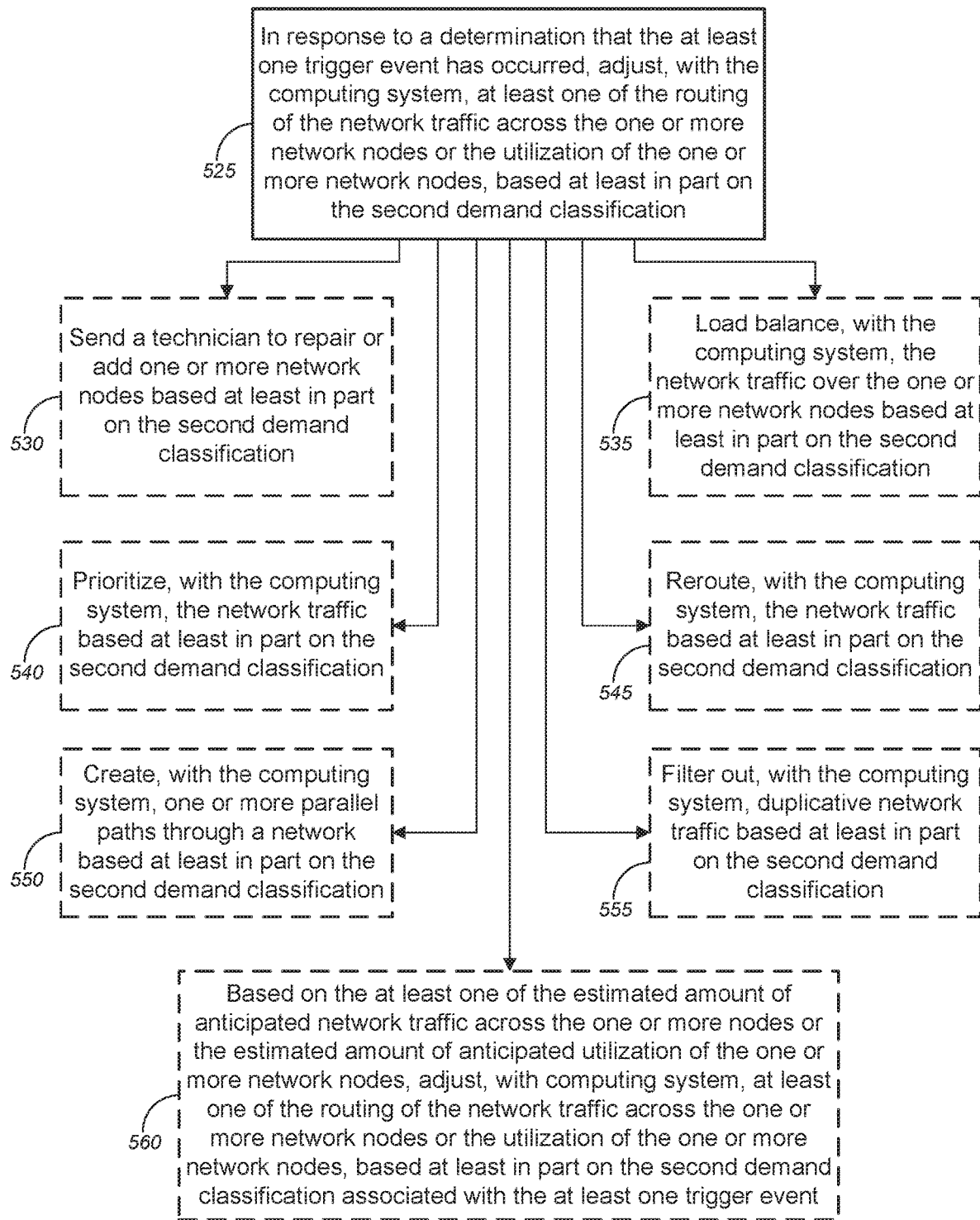
Figure 5C:
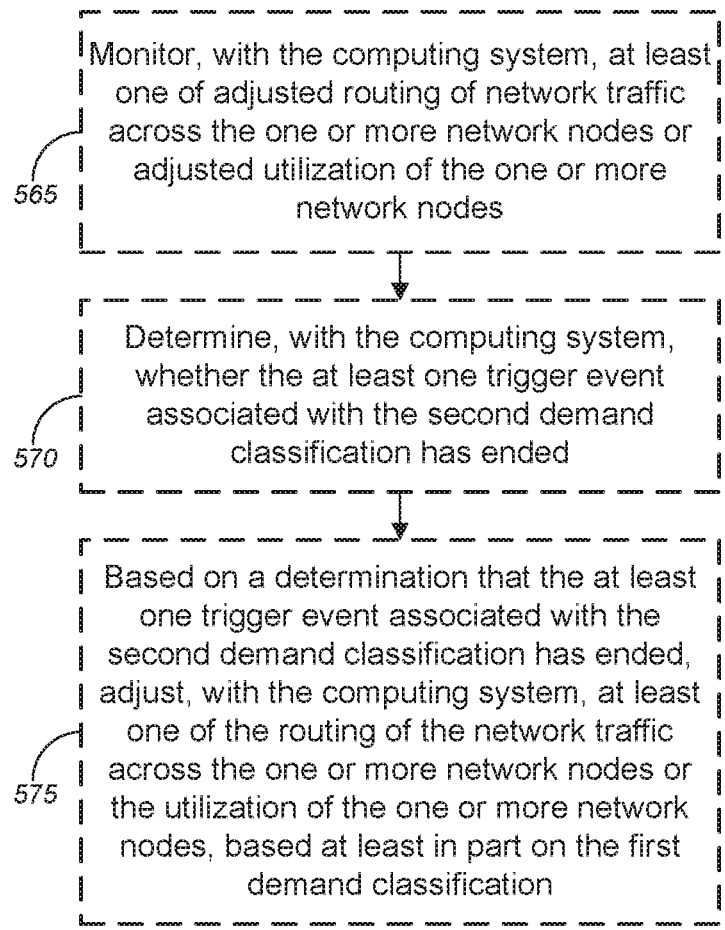

FIGS. 5A-5C (collectively, "FIG. 5") are flow diagrams for implementing routing of network traffic across one or more network nodes or utilization of the one or more network nodes, in accordance with various embodiments.

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems, examples, or embodiments 100, 200, 300, and 400 of FIGS. 1, 2, 3, and 4, respectively (or components thereof), such methods may also be implemented using any suitable hardware (or software) implementation. Similarly, while each of the systems, examples, or embodiments 100, 200, 300, and 400 of FIGS. 1, 2, 3, and 4, respectively, (or components thereof), can operate according to the method 500 illustrated by FIG. 5 (e.g., by executing instructions embodied on a computer readable medium), the systems, examples, or embodiments 100, 200, 300, and 400 of FIGS. 1, 2, 3, and 4 can each also operate according to other modes of operation and/or perform other suitable procedures.

In the non-limiting embodiment of FIG. 5A, method 500, at block 505, might comprise monitoring, with a computing system, at least one of network traffic across one or more network nodes or utilization of the one or more network nodes, wherein at least one of routing of the network traffic across the one or more network nodes or utilization of the one or more network nodes is controlled based at least in part on a first demand classification.

In some cases, the one or more network nodes may be shared among multiple users. The one or more network nodes may comprise at least one of one or more computing systems, one or more network elements, one or more server computers, one or more databases, one or more service provider devices, one or more user devices, one or more gateways, and/or the like. The one or more user devices might include, without limitation, at least one of a desktop computer associated with the user, a laptop computer associated with the user, a tablet computer associated with the user, a smart phone associated with the user, a cellphone associated with the user, a personal digital assistant associated with the user, a remote-control device associated with the user, or a portable gaming device associated with the user, and/or the like.

In some cases, the network traffic across the one or more network nodes might include at least one of data traffic, audio traffic, or video traffic, and/or the like. Additionally and/or alternatively, the network traffic may be associated with at least one of a residential user, a residential premises, a business user, a business premises, an emergency responder, and/or the like.

The first demand classification may be a default demand classification. In a non-limiting example, the first demand classification may correspond to a standard quality of service ("QoS") classification that defines one or more rules to control the routing of the network traffic across the one or more network nodes or utilization of the one or more network nodes. The first demand classification may be associated with one or more first rules for controlling at least one of routing of the network traffic across the one or more network nodes or utilization of the one or more network nodes.

At block 510, method 500 might include determining, with the computing system, whether at least one trigger event associated with a second demand classification has occurred. The second demand classification may be associated with abnormal or atypical network traffic across one or more nodes and/or abnormal or atypical utilization of the one or more nodes. The second demand classification may be associated with one or more second rules associated with the trigger event for controlling at least one of routing of the network traffic across the one or more network nodes or utilization of the one or more network nodes.

In some embodiments, the at least one trigger event associated with the second demand classification might include, without limitation, at least one of a failure of the one or more network nodes, a customer creating network traffic across the one or more network nodes or utilizing the one or more network nodes, a user event creating network traffic across the one or more network nodes or utilizing the one or more network nodes, an environmental event causing network traffic to be created across the one or more network nodes or utilization of the one or more network nodes, an emergency event causing network traffic to be created across the one or more network nodes or utilization of the one or more network nodes, a location event creating network traffic across the one or more network nodes or utilizing the one or more network nodes, an unanticipated increase in at least one of the network traffic across the one or more network nodes or the utilization of one or more network nodes, or an anticipated increase in at least one of the network traffic across the one or more network nodes or the utilization of the one or more network nodes, and/or the like.

The customer creating network traffic across the one or more network nodes or utilizing the one or more network nodes might include, without limitation, at least one of one or more emergency responders, one or more business customers, one or more government customers, one or more residential customers, one or more devices, one or more machine-to-machine devices, or one or more Internet of Things ("IoT") devices, and/or the like.

The user event creating network traffic across the one or more network nodes or utilizing the one or more network nodes might include, without limitation, at least one of a user indicating a specific location to save data, a user indicating one or more routes to transmit network traffic, a user indicating one or more resources to utilize, or a user indicating network traffic to prioritize, and/or the like. In a non-limiting example, a user may indicate that data may need to be saved in a city, state, province, territory, region, or country where the user resides. A user may indicate that data may need to be routed through a city, state, province, territory, region, or country where the user resides or that the data may need to be routed to avoid a particular city, state, province, territory, region, or country. A user may also indicate that network traffic associated with a download should be prioritized over other network traffic. The computing system might analyze header data of one or more data packets to determine whether a user has indicated at least one of a specific location to save data, one or more routes to transmit network traffic, one or more resources to utilize, or network traffic to prioritize, and/or the like.

The environmental event causing network traffic to be created across the one or more network nodes or utilization of the one or more network nodes, might include, without limitation, at least one of a storm, a fire, a hurricane, a tornado, a flood, an earthquake, a tsunami, a thunderstorm, a snowstorm, or a rockslide, and/or the like. The emergency event causing network traffic to be created across the one or more network nodes or utilization of the one or more network nodes, might include, without limitation, at least one of a fire, a medical emergency, a police emergency, a storm, a hurricane, a tornado, a flood, an earthquake, a tsunami, a thunderstorm, a snowstorm, or a rockslide, and/or the like. In a non-limiting example, the computing system might prioritize data received from geographic locations associated with an environmental event or an emergency event.

The anticipated increase in at least one of the network traffic across the one or more network nodes or the utilization of the one or more network nodes, might include, at least one of an anticipated increase in the number of users in one location or an anticipated increase in the utilization of resources in one location, and/or the like. The computing system might make additional resources available to locations where there is an anticipated increase in the number of users or an anticipated increase in the utilization of resources.

At optional block 515, the method 500 might include determining, with the computing system, whether the at least one trigger event is occurring based at least in part on utilization of one of a block sampling technique or a sliding window sampling technique, or the like. A block sampling technique or a window sampling technique may be utilized by the computing system to observe at least one of network traffic, a demand for a resource, or a utilization of a resource by each of a plurality of demand classifications. Based on the information obtained via the block sampling technique or the sliding window sampling technique, the computing system may determine that a trigger event associated with a second demand classification is occurring.

At optional block 520, the method 500 might further include estimating, with the computing system, at least one of an amount of anticipated network traffic across the one or more network nodes or an amount of anticipated utilization of the one or more network nodes based at least in part on the at least one trigger event. In a non-limiting example, the computing system might estimate at least one of an amount of the network traffic across the one or more network nodes or an amount of the utilization of the one or more network nodes based on the detected trigger event. In another non-limiting example, the computing system might determine that at least one of the network traffic across the one or more network nodes or the utilization of the one or more network nodes might increase because of an increased number of users in a location. For example, when a sporting event is about to occur, the computing system might shift one or more network resources to accommodate the increase in at least one of the network traffic across the one or more network nodes or the utilization of the one or more network nodes.

The method 500, at block 525 might additionally include, in response to a determination that the at least one trigger event has occurred, adjusting, with the computing system, at least one of the routing of the network traffic across the one or more network nodes or the utilization of the one or more network nodes, based at least in part on the second demand classification.

In various embodiments, optional blocks 530-560, shown in FIG. 5B, represent one or more optional ways for adjusting, with the computing system, at least one of the routing of the network traffic across the one or more network nodes or the utilization of the one or more network nodes, based at least in part on the second demand classification (block 525). The one or more adjustments might include, without limitation, (1) sending a technician to repair or add one or more network nodes based at least in part on the second demand classification (optional block 530); (2) load balancing, with the computing system, the network traffic over the one or more network nodes based at least in part on the second demand classification (optional block 535); (3) prioritizing, with the computing system, the network traffic based at least in part on the second demand classification (optional block 540); (4) rerouting, with the computing system, the network traffic based at least in part on the second demand classification (optional block 545); (5) creating, with the computing system, one or more parallel paths through a network based at least in part on the second demand classification (optional block 550); (6) filtering out, with the computing system, duplicative network traffic based at least in part on the second demand classification (optional block 555); or (7) based on the at least one of the estimated amount of anticipated network traffic across the one or more network nodes or the estimated amount of anticipated utilization of the one or more network nodes, adjusting, with computing system, at least one of the routing of the network traffic across the one or more network nodes or the utilization of the one or more network nodes, based at least in part on the second demand classification associated with the at least one trigger event (optional block 560); and/or the like.

Once the computing system adjusts at least one of the routing of the network traffic across the one or more network nodes or the utilization of the one or more network nodes, based at least in part on the second demand classification (block 525), method 500 might proceed, at optional block 565 in FIG. 5C, with monitoring, with the computing system, at least one of adjusted routing of network traffic across the one or more network nodes or adjusted utilization of the one or more network nodes. Next, the method 500 might determine, with the computing system (at optional block 570), whether the at least one trigger event associated with the second demand classification has ended. Based on a determination that the at least one trigger event associated with the second demand classification has ended, the method 500, at optional block 575, might include adjusting, with the computing system, at least one of the routing of the network traffic across the one or more network nodes or the utilization of the one or more network nodes, based at least in part on the first demand classification.

Exemplary System and Hardware Implementation

Figure 6:
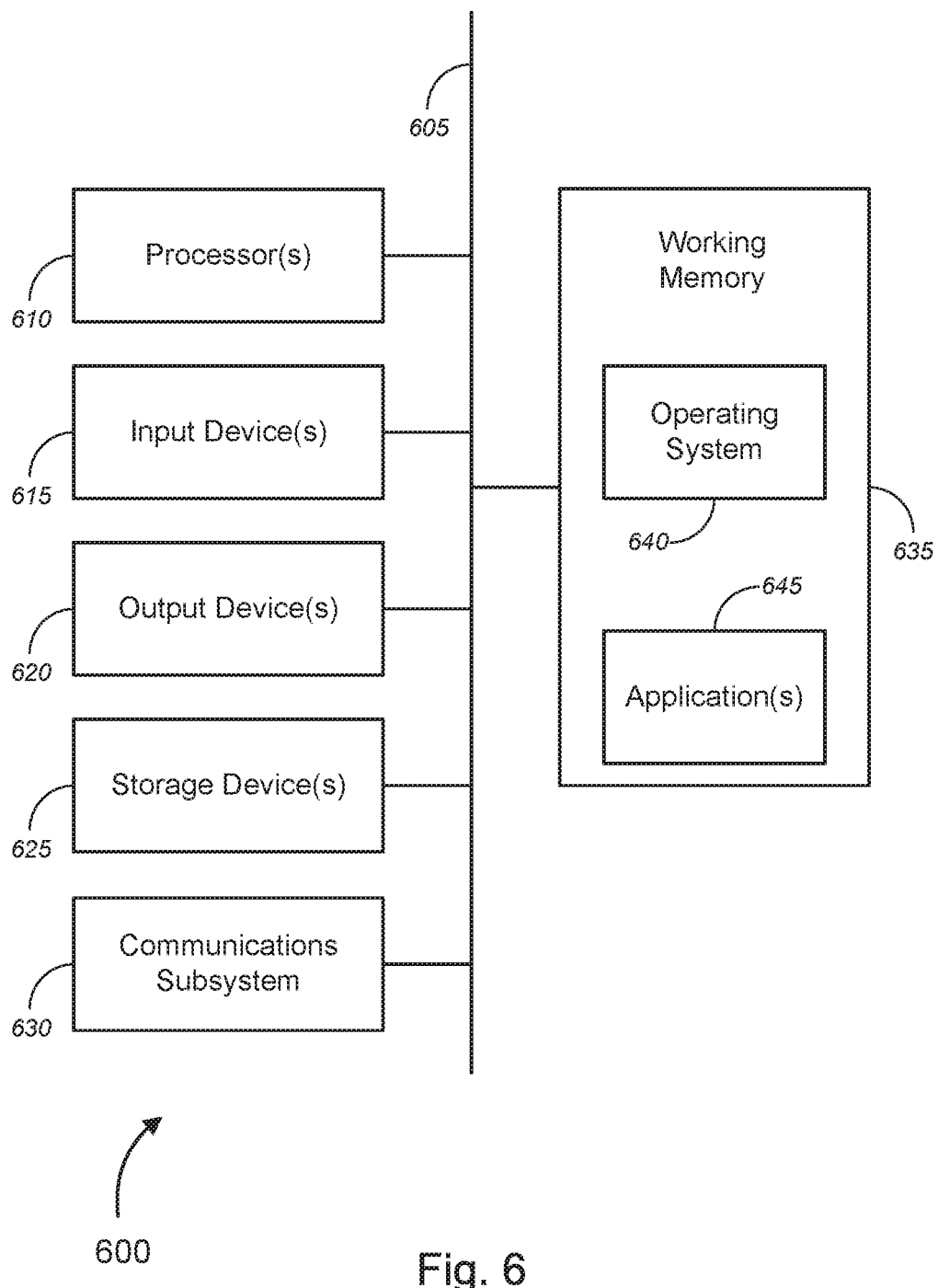
FIG. 6 is a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., computing systems 105, 205, 305, and 405, network nodes 110, 210, 310, and 410, source devices 115, 215, 315, and 415, and destination devices 120, 220, 320, and 420, etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system (i.e., computing systems 105, 205, 305, and 405, network nodes 110, 210, 310, and 410, source devices 115, 215, 315, and 415, and destination devices 120, 220, 320, and 420, etc.), described above with respect to FIGS. 1-4—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard, and/or the like; and one or more output devices 620, which can include, without limitation, a display device, a printer, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire, and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
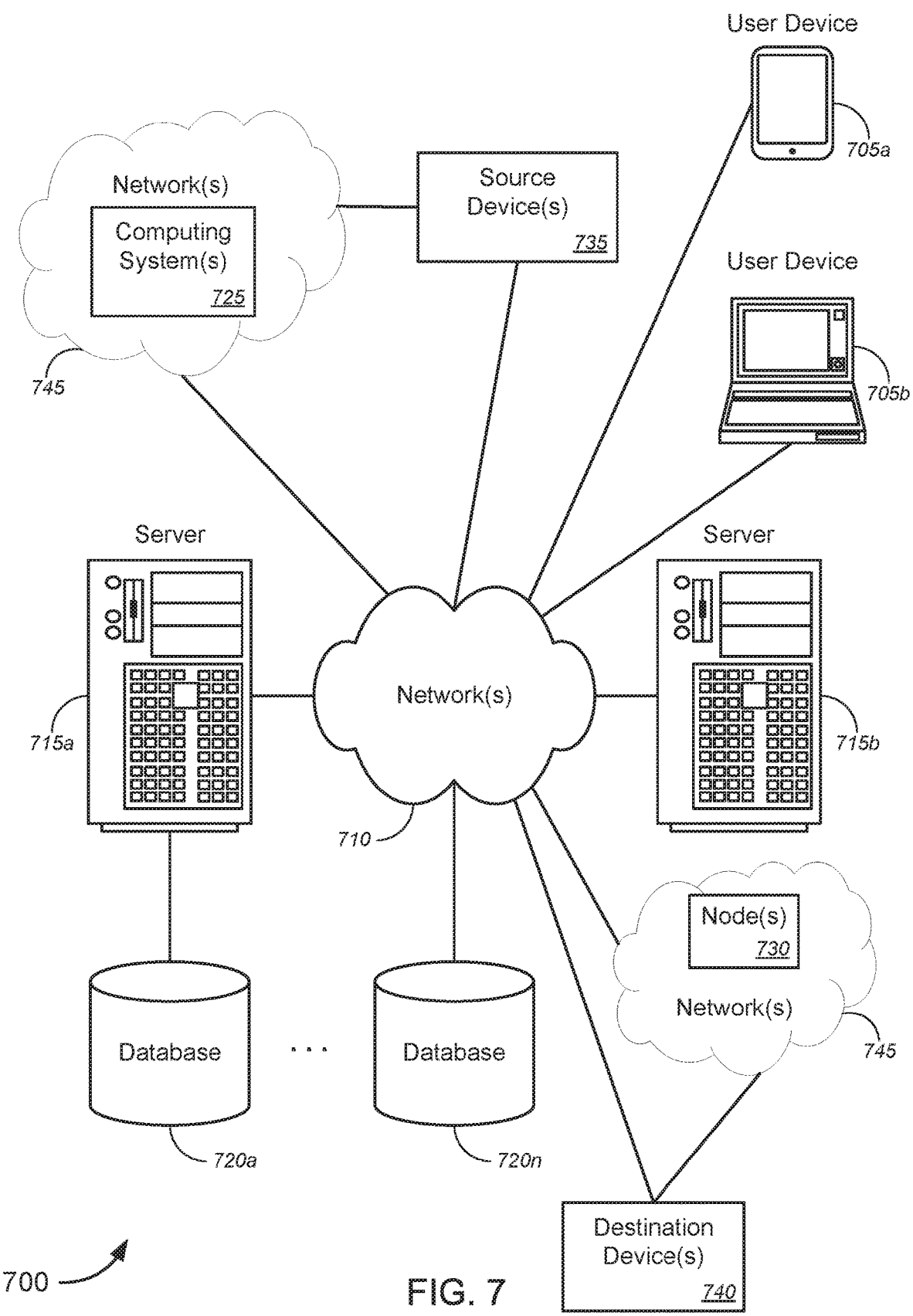
FIG. 7 is a block diagram illustrating a networked system of computing systems, which may be used in accordance with various embodiments.

As noted above, a set of embodiments comprises methods and systems for implementing routing of network traffic across one or more network nodes or utilization of the one or more network nodes, and, more particularly, to methods, systems, and apparatuses for implementing routing of network traffic across the one or more network nodes or utilization of the one or more network nodes based on one or more demand classifications and/or based on detection of a trigger event associated with the one or more demand classifications. FIG. 7 illustrates a schematic diagram of a system 700 that can be used in accordance with one set of embodiments. The system 700 can include one or more user computers, user devices, or customer devices 705. A user computer, user device, or customer device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 705 can also have any of a variety of applications, including one or more applications configured to perform methods provided by various embodiments (as described above, for example), as well as one or more office applications, database client and/or server applications, and/or web browser applications. Alternatively, a user computer, user device, or customer device 705 can be any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user computers, user devices, or customer devices 705, any number of user computers, user devices, or customer devices can be supported.

Certain embodiments operate in a networked environment, which can include a network(s) 710. The network(s) 710 can be any type of network familiar to those skilled in the art that can support data communications using any of a variety of commercially available (and/or free or proprietary) protocols, including, without limitation, TCP/IP, SNA™, IPX™, AppleTalk™, and the like. Merely by way of example, the network(s) 710 (similar to networks 125, 225, 325, or 425 of FIG. 1, 2, 3, or 4, respectively, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing routing of network traffic across one or more network nodes or utilization of the one or more network nodes, and, more particularly, to methods, systems, and apparatuses for implementing routing of network traffic across the one or more network nodes or utilization of the one or more network nodes based on one or more demand classifications and/or based on detection of a trigger event associated with the one or more demand classifications, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). The location of each of the databases 720 is discretionary: merely by way of example, a database 720a might reside on a storage medium local to (and/or resident in) a server 715a (and/or a user computer, user device, or customer device 705). Alternatively, a database 720n can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

According to some embodiments, system 700 might further comprise a computing system(s) 725 (similar to computing system(s) 105, 205, 305, or 405 of FIG. 1, 2, 3, or 4, respectively, or the like).

In operation, the computing system 725 might monitor at least one of network traffic across one or more network nodes 730 or utilization of the one or more network nodes 730. The one or more network nodes 730 might include one or more source device(s) 735 and/or one or more destinations device(s) 740. The at least one of routing of the network traffic across the one or more network nodes 730 or utilization of the one or more network nodes 730 may be controlled based at least in part on a first demand classification. The computing system 725 may then determine whether at least one trigger event associated with a second demand classification has occurred. In response to a determination that the at least one trigger event has occurred, the computing system 725 might adjust at least one of the routing of the network traffic across the one or more network nodes 730 or the utilization of the one or more network nodes 730, based at least in part on the second demand classification. The computing system 725 and the one or more nodes may be located within network(s) 745. Network(s) 710 may include network(s) 745.

These and other functions of the system 700 (and its components) are described in greater detail above with respect to FIGS. 1-5.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method comprising:
monitoring, with a computing system, at least one of network traffic across one or more network nodes or utilization of the one or more network nodes, wherein at least one of routing of the network traffic across the one or more network nodes or utilization of the one or more network nodes is controlled based at least in part on a first demand classification;
determining, with the computing system, whether at least one trigger event associated with a second demand classification has occurred; and
in response to a determination that the at least one trigger event has occurred, adjusting, with the computing system, at least one of the routing of the network traffic across the one or more network nodes or the utilization of the one or more network nodes, based at least in part on the second demand classification,
wherein adjusting, with the computing system, at least one of the routing of the network traffic across the one or more network nodes or the utilization of the one or more network nodes, based at least in part on the second demand classification comprises:
determining at least one of a first part of the network traffic associated with the trigger event across the one or more network nodes or a first set of the one or more network nodes associated with the trigger event;
determining at least one of a second part of the network traffic unassociated with the trigger event across the one or more network nodes or a second set of the one or more network nodes unassociated with the trigger event; and
adjusting at least one of the routing of the first part of the network traffic associated with the trigger event across the one or more network nodes or the utilization of the first set of the one or more network nodes associated with the trigger event, based at least in part on one or more first rules contained within the second demand classification; and
maintaining at least one of the routing of the second part of the network traffic unassociated with the trigger event across the one or more network nodes or the utilization of the second set of the one or more network nodes unassociated with the trigger event based at least in part on one or more second rules contained within the second demand classification, wherein the one or more second rules are different from the one or more first rules, and wherein the one or more second rules are the same as one or more third rules contained within the first demand classification.

2. The method of claim 1, wherein the one or more network nodes are shared among multiple users.

3. The method of claim 1, wherein the first demand classification is a default demand classification.

4. The method of claim 1, wherein the first demand classification and the second demand classification are each associated with one or more rules for controlling at least one of the routing of the network traffic across the one or more network nodes or the utilization of the one or more network nodes.

5. The method of claim 1, further comprising:
monitoring, with the computing system, at least one of adjusted routing of network traffic across the one or more network nodes or adjusted utilization of the one or more network nodes;
determining, with the computing system, whether the at least one trigger event associated with the second demand classification has ended; and
based on a determination that the at least one trigger event associated with the second demand classification has ended, adjusting, with the computing system, at least one of the routing of the network traffic across the one or more network nodes or the utilization of the one or more network nodes, based at least in part on the first demand classification.

6. The method of claim 1, wherein the network traffic across the one or more network nodes comprises at least one of data traffic, audio traffic, or video traffic.

7. The method of claim 1, wherein the at least one trigger event associated with the second demand classification comprises at least one of a failure of the one or more network nodes, a customer creating network traffic across the one or more network nodes or utilizing the one or more network nodes, a user event creating network traffic across the one or more network nodes or utilizing the one or more network nodes, an environmental event causing network traffic to be created across the one or more network nodes or utilization of the one or more network nodes, an emergency event causing network traffic to be created across the one or more network nodes or utilization of the one or more network nodes, a location event creating network traffic across the one or more network nodes or utilizing the one or more network nodes, an unanticipated increase in at least one of the network traffic across the one or more network nodes or the utilization of one or more network nodes, or an anticipated increase in at least one of the network traffic across the one or more network nodes or the utilization of the one or more network nodes.

8. The method of claim 7, wherein the customer creating network traffic across the one or more network nodes or utilizing the one or more network nodes comprises at least one of one or more emergency responders, one or more business customers, one or more government customers, one or more residential customers, one or more devices, one or more machine-to-machine devices, or one or more Internet of Things devices.

9. The method of claim 7, wherein the user event creating network traffic across the one or more network nodes or utilizing the one or more network nodes comprises at least one of a user indicating a specific location to save data, a user indicating one or more routes to transmit network traffic, a user indicating one or more resources to utilize, or a user indicating network traffic to prioritize.

10. The method of claim 7, wherein the environmental event causing network traffic to be created across the one or more network nodes or utilization of the one or more network nodes comprises at least one of a storm, a fire, a hurricane, a tornado, a flood, an earthquake, a tsunami, a thunderstorm, a snowstorm, or a rockslide.

11. The method of claim 7, wherein the emergency event causing network traffic to be created across the one or more network nodes or utilization of the one or more network nodes comprises at least one of a fire, a medical emergency, a police emergency, a storm, a hurricane, a tornado, a flood, an earthquake, a tsunami, a thunderstorm, a snowstorm, or a rockslide.

12. The method of claim 7, wherein the anticipated increase in at least one of the network traffic across the one or more network nodes or the utilization of the one or more network nodes comprises at least one of an anticipated increase in the number of users in one location or an anticipated increase in the utilization of resources in one location.

13. The method of claim 1, wherein adjusting, with the computing system, at least one of the routing of the network traffic across the one or more network nodes or the utilization of the one or more network nodes, based at least in part on the second demand classification comprises at least one of:
sending, with the computing system, a technician to repair or add one or more network nodes based at least in part on the second demand classification;
load balancing, with the computing system, the network traffic over the one or more network nodes based at least in part on the second demand classification;
prioritizing, with the computing system, the network traffic based at least in part on the second demand classification;
rerouting, with the computing system, the network traffic based at least in part on the second demand classification;
creating, with the computing system, one or more parallel paths through a network based at least in part on the second demand classification; or
filtering out, with the computing system, duplicative network traffic based at least in part on the second demand classification.

14. The method of claim 1, further comprising:
determining, with the computing system, whether the at least one trigger event is occurring based at least in part on utilization of one of a block sampling technique or a sliding window sampling technique.

15. The method of claim 14, wherein a sampling interval for block sampling or for sliding window sampling is 8 seconds or less.

16. The method of claim 1, further comprising:
estimating, with the computing system, at least one of an amount of anticipated network traffic across the one or more network nodes or an amount of anticipated utilization of the one or more network nodes based at least in part on the at least one trigger event; and
based on the at least one of the estimated amount of anticipated network traffic across the one or more network nodes or the estimated amount of anticipated utilization of the one or more network nodes, adjusting, with computing system, at least one of the routing of the network traffic across the one or more network nodes or the utilization of the one or more network nodes, based at least in part on the second demand classification associated with the at least one trigger event.

17. The method of claim 1 wherein adjusting, with the computing system, at least one of the routing of the network traffic across the one or more network nodes or the utilization of the one or more network nodes, based at least in part on the second demand classification comprises:
   determining, with the computing system, a total amount of bandwidth associated with at least one network node of the one or more network nodes;
   determining, with the computing system, an amount of bandwidth needed to adjust at least one of the routing of the first part of the network traffic associated with the trigger event across the at least one network node of the one or more network nodes or the utilization of the first set of the one or more network nodes associated with the trigger event, based at least in part on the one or more first rules contained within the second demand classification;
   based on a determination that the amount of bandwidth needed is less than the total amount of bandwidth of the one or more network nodes, sharing at least one of the routing of the first part of the network traffic associated with the trigger event across the one or more network nodes or the utilization of the one or more network nodes associated with the trigger event, based at least in part on one or more first rules contained within the second demand classification with at least one of the routing of the second part of the network traffic unassociated with the trigger event across the one or more network nodes or the utilization of the second set of the one or more network nodes unassociated with the trigger event based at least in part on one or more second rules.

18. An apparatus, comprising:
   at least one processor; and
   a non-transitory computer readable medium communicatively coupled to the at least one processor, the non-transitory computer readable medium having stored thereon computer software comprising a set of instructions that, when executed by the at least one processor, causes the apparatus to:
   monitor at least one of network traffic across one or more network nodes or utilization of the one or more network nodes, wherein at least one of routing of the network traffic across the one or more network nodes or utilization of the one or more network nodes is controlled based at least in part on a first demand classification;
   determine whether at least one trigger event associated with a second demand classification has occurred; and
   in response to a determination that the at least one trigger event has occurred, adjust at least one of the routing of the network traffic across the one or more network nodes or the utilization of the one or more network nodes, based at least in part on the second demand classification,
   wherein adjusting at least one of the routing of the network traffic across the one or more network nodes or the utilization of the one or more network nodes, based at least in part on the second demand classification comprises:
   determining at least one of a first part of the network traffic associated with the trigger event across the one or more network nodes or a first set of the one or more network nodes associated with the trigger event;
   determining at least one of a second part of the network traffic unassociated with the trigger event across the one or more network nodes or a second set of the one or more network nodes unassociated with the trigger event; and
   adjusting at least one of the routing of the first part of the network traffic associated with the trigger event across the one or more network nodes or the utilization of the first set of the one or more network nodes associated with the trigger event, based at least in part on one or more first rules contained within the second demand classification; and
   maintaining at least one of the routing of the second part of the network traffic unassociated with the trigger event across the one or more network nodes or the utilization of the second set of the one or more network nodes unassociated with the trigger event based at least in part on one or more second rules contained within the second demand classification, wherein the one or more second rules are different from the one or more first rules, and wherein the one or more second rules are the same as one or more third rules contained within the first demand classification.

19. A system, comprising:
   one or more network nodes; and
   a computing system communicatively coupled to the one or more network nodes, the computing system comprising:
   at least one first processor; and
   a first non-transitory computer readable medium communicatively coupled to the at least one first processor, the first non-transitory computer readable medium having stored thereon computer software comprising a first set of instructions that, when executed by the at least one first processor, causes the computing system to:
   monitor at least one of network traffic across the one or more network nodes or utilization of the one or more network nodes, wherein at least one of routing of the network traffic across the one or more network nodes or utilization of the one or more network nodes is controlled based at least in part on a first demand classification;
   determine whether at least one trigger event associated with a second demand classification has occurred; and
   in response to a determination that the at least one trigger event has occurred, adjust at least one of the routing of the network traffic across the one or more network nodes or the utilization of the one or more network nodes, based at least in part on the second demand classification,
   wherein adjusting, with the computing system, at least one of the routing of the network traffic across the one or more network nodes or the utilization of the one or more network nodes, based at least in part on the second demand classification comprises:
   determining at least one of a first part of the network traffic associated with the trigger event across the one or more network nodes or a first set of the one or more network nodes associated with the trigger event;
   determining at least one of a second part of the network traffic unassociated with the trigger event across the one or more network nodes or a second set of the one or more network nodes unassociated with the trigger event; and adjusting at least one of the routing of the first part of the network traffic associated with the trigger event across the one or more network nodes or the utilization of the first set of the one or more network nodes associated with the trigger event, based at least in part on one or more first rules contained within the second demand classification; and maintaining at least one of the routing of the second part of the network traffic unassociated with the trigger event across the one or more network nodes or the utilization of the second set of the one or more network nodes unassociated with the trigger event based at least in part on one or more second rules contained within the second demand classification, wherein the one or more second rules are different from the one or more first rules, and wherein the one or more second rules are the same as one or more third rules contained within the first demand classification.

\* \* \* \* \*